United States Patent
Abrams, Jr. et al.

(10) Patent No.: US 7,212,574 B2
(45) Date of Patent: May 1, 2007

(54) DIGITAL PRODUCTION SERVICES ARCHITECTURE

(75) Inventors: Thomas Algie Abrams, Jr., Snohomish, WA (US); Mark F. Beauchamp, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 10/206,579

(22) Filed: Jul. 26, 2002

(65) Prior Publication Data

US 2003/0208638 A1 Nov. 6, 2003

Related U.S. Application Data

(63) Continuation-in-part of application No. 10/115,681, filed on Apr. 2, 2002.

(51) Int. Cl.
H04N 7/18 (2006.01)
(52) U.S. Cl. .............................. 375/240.25; 375/240.26
(58) Field of Classification Search ........ 707/510–515; 709/231–244
See application file for complete search history.

(56) References Cited

U.S. PATENT DOCUMENTS

| | | | |
|---|---|---|---|
| 5,253,047 A | 10/1993 | Machishima | |
| 5,497,192 A | 3/1996 | Ishizuka | |
| 5,517,236 A | 5/1996 | Sergeant et al. | |
| 5,774,666 A | 6/1998 | Portuesi | |
| 5,870,502 A | 2/1999 | Bonneau et al. | |
| 5,926,208 A | 7/1999 | Noonen et al. | |
| 6,061,720 A | 5/2000 | Kamel et al. | |
| 6,097,422 A | 8/2000 | Aref et al. | |
| 6,097,879 A | 8/2000 | Komatsu et al. | |
| 6,101,547 A | 8/2000 | Mukherjee et al. | |
| 6,182,116 B1 | 1/2001 | Namma et al. | |
| 6,233,389 B1 | 5/2001 | Barton et al. | |
| 6,259,386 B1 | 7/2001 | Miyawaki et al. | |
| 6,285,398 B1 | 9/2001 | Shinsky et al. | |
| 6,327,418 B1 | 12/2001 | Barton | |
| 6,445,411 B1 | 9/2002 | Shibata et al. | |
| 6,473,796 B2 | 10/2002 | Tanaka | |
| 6,545,708 B1 | 4/2003 | Tamayama et al. | |
| 6,564,380 B1 | 5/2003 | Murphy | |
| 6,654,060 B1 | 11/2003 | Kurosawa et al. | |
| 6,686,838 B1 | 2/2004 | Rezvani et al. | |
| 6,708,337 B2 | 3/2004 | Moysan et al. | |
| 6,909,457 B1 | 6/2005 | Fukasawa | |
| 2001/0001024 A1 | 5/2001 | Yanagihara et al. | |
| 2001/0052909 A1 | 12/2001 | Kumagai et al. | |
| 2002/0118286 A1 | 8/2002 | Kanade et al. | |
| 2002/0118969 A1 | 8/2002 | Kanade et al. | |
| 2002/0143819 A1* | 10/2002 | Han et al. ................... | 707/513 |
| 2002/0145660 A1 | 10/2002 | Kanade et al. | |
| 2003/0065805 A1* | 4/2003 | Barnes, Jr. .................. | 709/231 |

OTHER PUBLICATIONS

General Micro Systems Incorporated brochure, "Hydra V2P3 Pentium III Processor Industrial Single Board Computer," 2 pages.

(Continued)

*Primary Examiner*—Andy Rao
(74) *Attorney, Agent, or Firm*—Lee & Hayes, PLLC

(57) ABSTRACT

Methods, units, systems, architectures and/or storage media for video and/or audio processing. An exemplary architecture includes one or more layers selected from, for example, service and/or application layers, storage area network layers, digital asset management layers, and/or enterprise applications integration and/or business process automation layers. Various exemplary methods, units, systems and/or storage media are also disclosed.

35 Claims, 19 Drawing Sheets

OTHER PUBLICATIONS

Optibase Inc. brochure, "VideoPump Uncompressed HIgh Definition & Standard Definition Serial Digital Video to PCI Interfaces," 2001, 4 pages.

Panasonic brochure, "Panasonic DVCPRO News Automation," Revision 2.0/Dec. 1999, 16 pages.

Panasonic Broadcast & Television Systems Company brochure, "DVCPRO The Way to DTV and HDTV," pp. 1-12.

Sony Electronics Inc. brochure, "MPEG-2 Networked Video Server MAV-70," 1999, 8 pages.

Panasonic Broadcast and Television Systems Company brochure, AJ-HDR150 HD/SD Multi-Format DVCPRO Video Server—AJ-HDP151 DVCPRO HD Codec Unit, 6 pages.

Panasonic Broadcast and Television Systems Company brochure, "HD High Definition AJ-UFC1800 Universal Format Converter," 4 pages.

Cirrus Logic, Inc., Crystal Semiconductor Products Division, "AN80-Digital CCD Camera Design Guide", Dec. 1998, pp. 1-22.

Steve Beeching, I. Eng., A.M.I.E.E., "Video and Camcorder Servicing and Technology", Newnes, Jan. 2001, pp. i-viii.

Barnes, et al. "A Mehtod and Apparatus For Providing Communication Transmissions"; Filed Jun. 29, 2000; Title pages plus pp. 1-82; 5 sheets of formal drawings figs. 1-4B, U.S. Appl. No. 09/606,350.

* cited by examiner

DIGITAL PRODUCTION SERVICES ARCHITECTURE

CROSS-REFERENCE TO RELATED APPLICATION

This application is a continuation-in-part of an application entitled "Video Appliance", to inventor Thomas Algie Abrams, Jr. and Mark Beauchamp, assigned to Microsoft Corporation, filed on Apr. 2, 2002 and having Ser. No. 10/115,681, and the contents of which are incorporated by reference herein.

TECHNICAL FIELD

This invention relates generally to methods, devices, systems and/or storage media for video and/or audio processing.

BACKGROUND

Various media and media-related industries (e.g., broadcasters, security, etc.) face tremendous pressure to improve operational efficiency, reduce costs, improve profitability and find new revenue opportunities. In response to such pressure, some of these industries are making a transition to digital technology. However, many digital technologies remain disparate due to proprietary and/or incompatible components. Thus, a need exists for technologies that promote interoperability. Technologies having inherent interoperability and/or capable of promoting interoperability are presented below.

SUMMARY

Methods, units, systems, architectures and/or storage media for video and/or audio processing. An exemplary architecture includes one or more layers selected from, for example, service and/or application layers, storage area network layers, digital asset management layers, and/or enterprise applications integration and/or business process automation layers. Such an exemplary architecture allows for sharing of information and interoperability of services and/or applications in a platform agnostic manner. Various exemplary systems capable of implementing such an architecture are disclosed herein.

An exemplary method uses one or more disparate services and/or applications to achieve a video production goal (e.g., acquisition, processing, transmission, etc.). Another exemplary method describes services and/or applications for acquisition, processing and transmission of digital video according to a service definition language; registers the services and/or the applications in a registry; and exposes the services and/or the applications on a network. Control and/or management of such services and/or applications optionally occurs through use of framework capabilities, such as, but not limited to, executable files and/or codes, runtime engines, etc. Various exemplary units and/or systems capable of implementing such methods are disclosed herein.

An exemplary unit includes one or more communications links for communicating digital video and metadata, a service and/or an application for acquisition, processing and/or transmission of digital video; and a software interface and/or a software connector that exposes the service and/or the application on a network. Such an exemplary unit optionally includes framework capabilities, such as, but not limited to, a runtime engine capable of executing executable files and/or codes. An exemplary system optionally includes one or more of such units.

Additional features and advantages of the various exemplary methods, devices, systems, architectures and/or storage media will be made apparent from the following detailed description of illustrative embodiments, which proceeds with reference to the accompanying figures.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Figure 1:
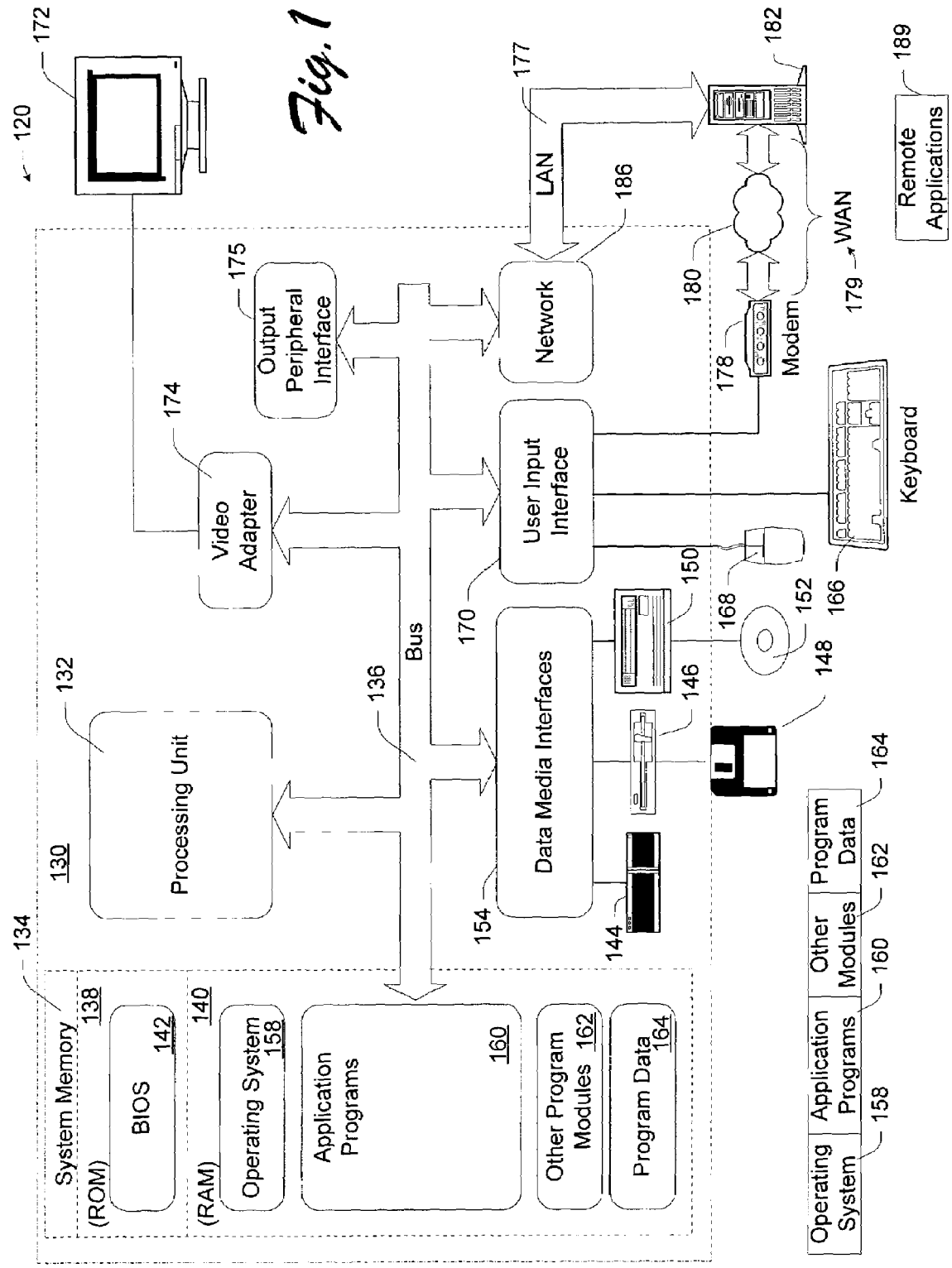
FIG. 1 is a block diagram illustrating an exemplary computer and/or computing environment suitable for use with various methods, units, system, and/or architectures described herein.

Turning to the drawings, wherein like reference numerals refer to like elements, various methods are illustrated as being implemented in a suitable computing environment. Although not required, various exemplary methods will be described in the general context of computer-executable instructions, such as program modules, being executed by a personal computer and/or other computing device. Generally, program modules include routines, programs, objects, components, data structures, etc. that perform particular tasks or implement particular abstract data types. Moreover, those skilled in the art will appreciate that various exemplary methods may be practiced with other computer system configurations, including hand-held devices, multi-processor systems, microprocessor based or programmable consumer electronics, network PCs, minicomputers, mainframe computers, and the like. Various exemplary methods may also be practiced in distributed computing environments where tasks are performed by remote processing devices that are linked through a communications network. In a distributed computing environment, program modules may be located in both local and remote memory storage devices.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Overview

Various technologies are described herein that pertain generally to digital video and/or audio. Various exemplary methods, units and/or systems optionally include, and/or operate in conjunction with, an architecture that supports local and/or global interoperability. For example, an exemplary architecture may accommodate objectives such as fault tolerance, performance, scalability and flexibility for use in media acquisition, production and/or broadcast environments. In this example, the architecture has one or more layers, such as, but not limited to, a service and/or application (S/A) layer, a storage area network (SAN) layer, a digital asset management (DAM) layer and/or a control and/or messaging layer (e.g., EAI/BPA layer).

In a multilayer architecture, while a fully partitioned data model is possible (e.g., ISO/OSI Network Model), strengths implicit in one layer are optionally exploited to mitigate weaknesses of another layer. For example, functions and/or methods in an exemplary architecture optionally overlap between layers to provide a greater degree of flexibility and redundancy from both an implementation and operation perspective. In such an overlapping architecture, various layers may operate to provide data storage at the application/service layer, the SAN layer and/or the DAM layer. Metadata storage and transport may be implemented peer to peer, via SAN constructs or via the DAM layer. In addition, an application optionally includes some degree of intrinsic business processes automation (BPA) capability (e.g. photoshop scripting, etc.), also consider an exemplary DAM implementation having such capabilities via workflow metaphors. BIZTALK® software (Microsoft Corporation, Redmond, Wash.), of course, may represent a more highly abstracted means of BPA implementation.

In general, a services and/or applications layer includes services, applications and/or other functionality. Such services, applications and/or functionality are optionally provided in a computing environment having units and/or components that rely on one or more platforms and/or operating systems. In a typical computing environment, or system, such units and/or components optionally operate autonomously, synchronously and/or asynchronously.

A typical SAN layer may include on-line, nearline, and/or offline storage sites wherein files across storage sites are optionally presented as a standard file system. A SAN layer optionally exposes itself as a unified storage service. Further, a SAN layer may allow for synchronization between a local application and/or other functionality and the SAN layer. The SAN layer may include a disk array managed by one or more processors having one or more channels (or a switched fabric) to one or more servers or workstations or it may include a network attached storage (NAS) that combines functions of a SAN and an OS to present filesystem services as an appliance on a local or wide area network. Of course, an exemplary architecture may include a combination of SAN and NAS storage layers and/or other storage layers. Yet further, a SAN layer might include additional means of storage virtualization and/or data protection which may include RAID5, mirroring, "snapshot" capability, geographic distribution, synchronization and/or backup to external media.

An exemplary DAM layer optionally includes content and/or archival management services. For example, a DAM layer may provide for abstraction of digital assets from files into extended metadata, relationships, versioning, security, search and/or other management related services. A DAM layer optionally includes APIs and/or other interfaces to access hardware and/or software functionality. For example, an exemplary DAM layer specifies one or more APIs that expose functionality and allow for any degree of local and/or global interoperability. Such interoperability may allow for management and/or workflow integration across one or more computing environments. For example, a DAM layer may provide digital asset library management services or digital media repository management services that allow for data distribution and/or access to one or more computing environments (e.g., client environments, production environments, post-production environments, broadcast environments, etc.).

A control and/or messaging layer optionally includes enterprise applications integration (EAI) and/or business process automation (BPA). For example, such a layer may implement software, such as, but not limited to, BIZTALK® software. A control and/or messaging layer optionally leverages framework capabilities locally and/or globally by using such software. In general, a control and/or messaging layer can support units and/or components, in one or more computing environments, in a platform independent manner.

Of course, an exemplary digital production services architecture may include an additional signal and/or plant layer to allow for control and timing of baseband video and/or audio.

Thus, as described herein, various exemplary units are suitable for use in a multilayered architecture. For example, to operate in conjunction with a DAM layer, an exemplary unit may include APIs to expose hardware and/or software functionality beyond the unit (e.g., to one or more other computing environments). An exemplary unit may also communicate video and/or audio metadata (VAM) via operation of one or more layers. Further, an exemplary unit optionally serves as the core of a SAN layer and/or a control and/or messaging layer. In general, an exemplary system may include an internal multilayer architecture that supports interoperability of internal units and/or components; an exemplary unit may also operate in conjunction with and/or support a multilayer architecture that extends beyond the system as well.

Various aspects of agility, extensibility, compatibility and/or interoperability optionally allow for preservation of existing platforms and processes. For example, exemplary methods, units and/or architectures optionally allow for streamlining media and/or metadata flow in a heterogeneous production environment. In addition, implementation of such methods, units and/or architectures does not necessarily force a disruption of traditional processes (i.e., optionally preserves traditional acquisition, processing, transmission and/or other processes).

By optionally adhering to emerging standards for content, metadata and event management, various technologies described herein can readily accommodate legacy, current and emerging components anywhere in a media system. While such an approach has numerous advantages at first implementation, other significant advantages may be realized over the extended life of the business needs served.

Various exemplary methods, devices, systems, and/or storage media are described with reference to front-end, intermediate, back-end, and/or front-to-back processes and/or systems. While specific examples of commercially available hardware, software and/or media are often given throughout the description below in presenting front-end, intermediate, back-end and/or front-to-back processes and/or systems, the exemplary methods, devices, systems and/or storage media, are not limited to such commercially available items.

Exemplary Computer and/Computing System

FIG. 1 illustrates an example of a suitable computing environment 120 on which the subsequently described methods and/or storage media may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment. Of course, the exemplary computing environment 120 may include an interface for one or more storage devices accessible via a standard or non-standard connection according to IEEE 1394, universal serial bus (USB), SCSI, fibrechannel, etc.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism. Of course, the environment 120 may include extensive network switching and/or routing capabilities, including but not limited to security (firewall) functionality, virtual private network (VPN), QOS, etc.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Exemplary Production Stages

Figure 2:
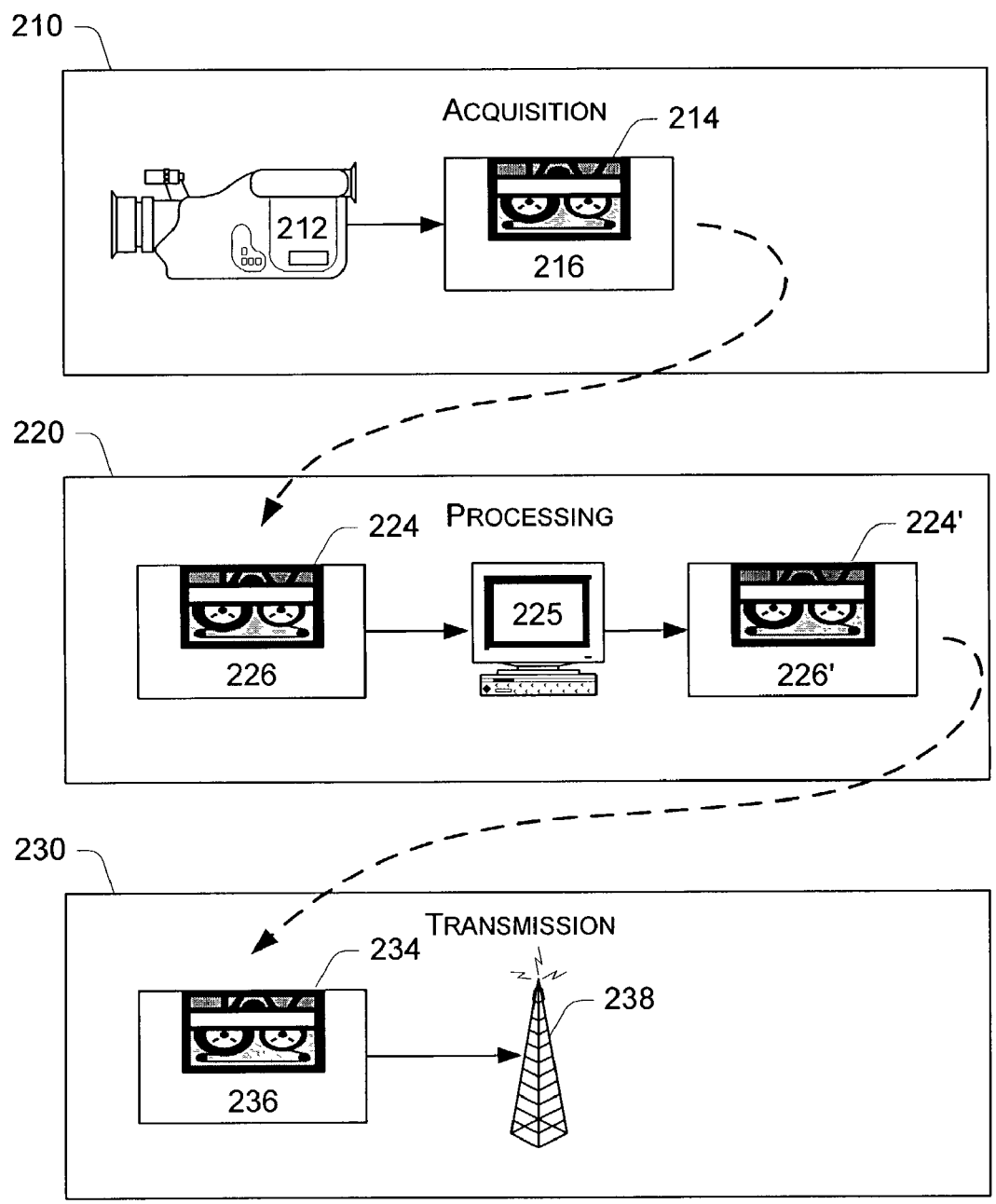
FIG. 2 is a block diagram illustrating various exemplary stages of a broadcast scenario.

Referring to FIG. 2, various stages of a professional video system are shown, including an acquisition stage 210, a processing stage 220 and a transmission stage 230. The acquisition stage 210 includes a camera 212 and a recorder 216 having a storage medium 214. In general, an acquisition stage (e.g., the acquisition stage 210) involves capturing audio and/or video content and committing the captured content to a storage medium (e.g., the storage medium 214) using a recorder (e.g., the recorder 216) and/or communicating the content to a live broadcast. The processing stage 220 includes a player 226 (typically a recorder/player) for playing recorded content from a storage medium 224, a processing unit 225 (e.g., a workstation or other computing device) for processing content, and a recorder 226' for recording processed content on a storage medium 224'. In general, a processing stage (e.g., the processing stage 220) processes raw content for to make it suitable for any of a variety of output venues, wherein the processing optionally includes content and/or structure processing. The distribution and/or transmission stage 230 includes a player 236 for playing recorded content from a storage medium 234 and a distribution and/or transmission means 238 to distribute and/or transmit the content. Various distribution and/or transmission means are known and include, for example, wireless, cable, network, etc. In general, a distribution and/or transmission stage (e.g., the stage 230) makes content available to viewers (e.g., end users, etc.) via an end user device. Typically, a viewer selects a station on an end user device (e.g., a television, computer, etc.) to view content (e.g., digital video, etc.).

Three exemplary non-limiting scenarios follow. In a first scenario, a security system has a camera that feeds one input of a quad screen processor which outputs the signal to one monitor and a recorder. In a second scenario, a high definition broadcast of a football game requires that approximately 15 or more cameras feed content to a content switcher (e.g., an AV switcher), where a director chooses content (e.g., shot cameras, angles, etc.) and routes the chosen content to a distribution and/or transmission stage (e.g., a TV station, etc.). In a third scenario, content for a commercial is recorded on film. Next, a telecine is used to convert the film-based content to digital content. The digital content is then processed (e.g., edited, etc.) and communicated to a distribution and/or transmission stage. While each of these three scenarios may have similar stages, the complexity and/or particulars of the individual stages (e.g., quality, real-time, etc.) may differ substantially. In addition, while a "tape-based" storage medium is shown, content is optionally stored on other storage media and/or acquired, processed, distributed and/or transmitted without storage at any particular stage. Technologies described herein, in various exemplary methods, systems, units, architectures and/or storage medium, are suitable for use in such scenarios as well as other scenarios.

Technology Chronology

Figure 3:
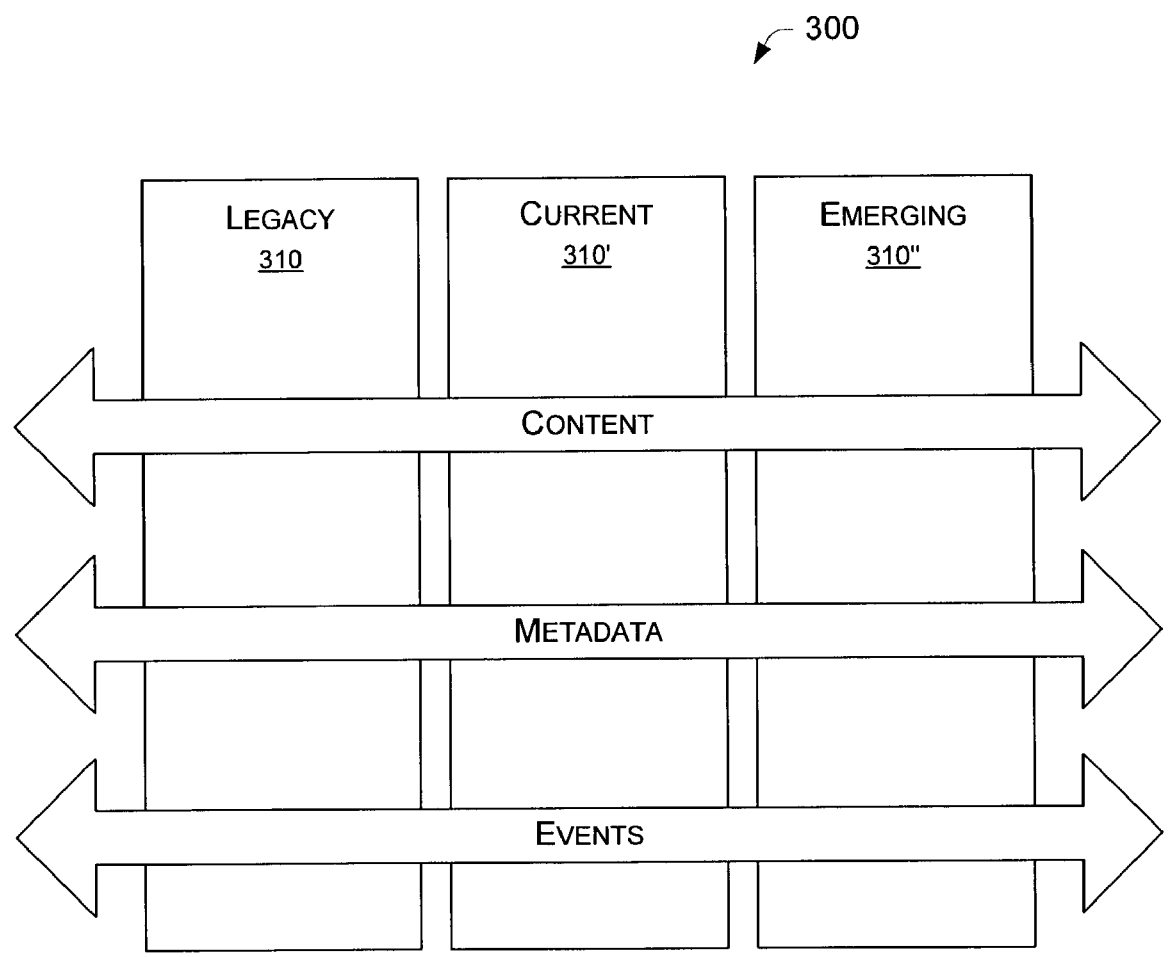
FIG. 3 is a diagram illustrating interoperability across legacy, current and emerging technologies.

Referring to FIG. 3, a legacy technology block 310, a current technology block 310' and an emerging technology block 310" are shown. These three blocks represent technologies of the past (e.g., the legacy block 310), technologies of the present (e.g., the current block 310') and technologies of the future (e.g., the emerging block). In general, technologies of the past have limitations. For example, in the past, individual manufacturers of AV acquisition equipment have been known to use proprietary software, formats, protocols, etc. Thus, in the past, by simply choosing a particular camera and/or recorder, one could become severely limited with respect to tape size (perhaps, nonstandard), compression algorithms, communication protocols, etc. At present, harmonization of some aspects of AV acquisition, processing and/or distribution and/or transmission has occurred; however, disparate gaps still exist and, further, backward (or forward) compatibility is not always guaranteed. Future or emerging technologies show no clear signs of squarely addressing issues of compatibility and/or extensibility, especially over a broad spectrum of technologies (e.g., legacy, current, emerging). In contrast, technologies presented herein address compatibility and/or extensibility issues. In particular, various exemplary methods, units, systems and/or architectures described herein promote interoperability. As shown in FIG. 3, technologies presented herein address content, metadata and/or event issues across legacy, current and emerging technologies. In particular, as described below, various exemplary digital production services architectures allow for compatibility and/or extensibility across a broad spectrum of technologies, for example, through use of various layers related to management of content, metadata and/or events. In various exemplary systems presented herein, at least some degree of interoperability occurs via software (e.g., framework software, interface software, connector software, etc.).

Exemplary Architecture

Figure 4:
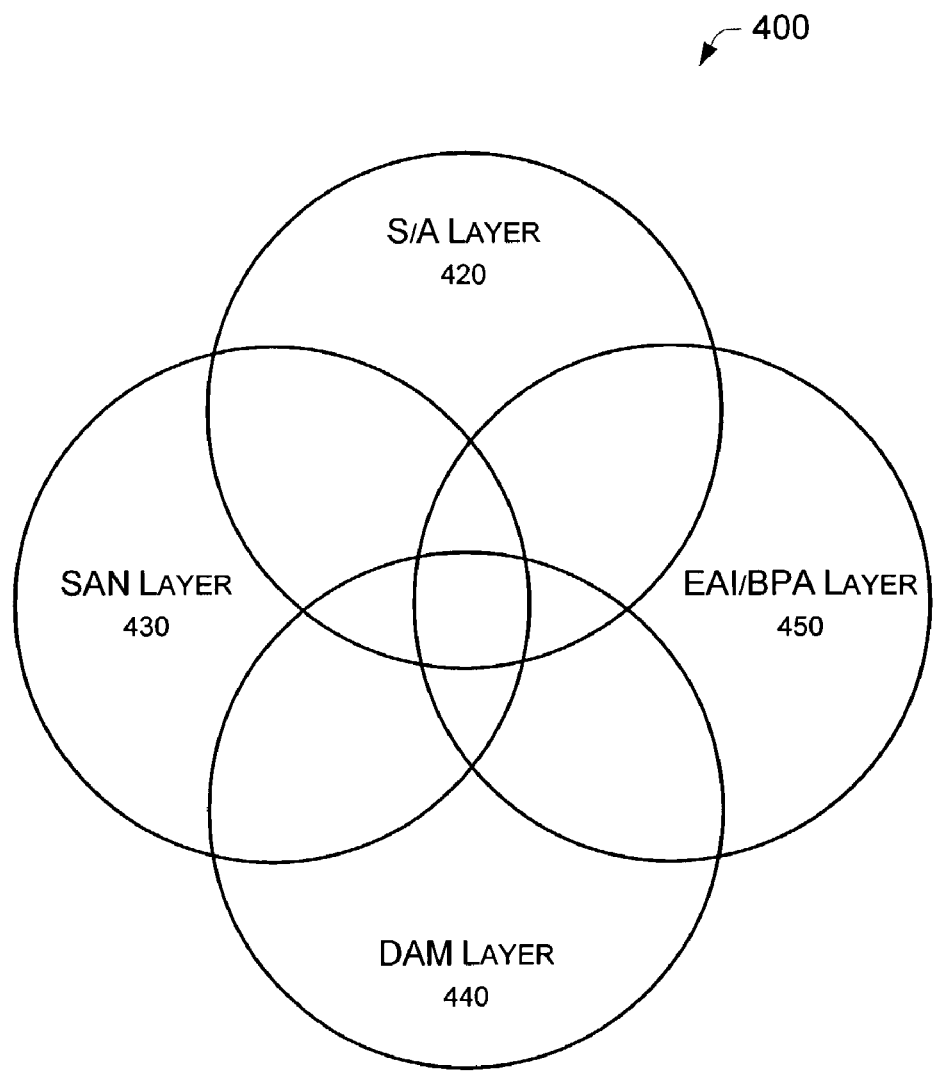
FIG. 4 is a block diagram illustrating an exemplary multilayer architecture for use in a media scenario.

Referring to FIG. 4, four overlapping layers of an exemplary digital production services architecture (DPSA) 400 are shown. Of course, such an architecture may optionally incorporate analog content as well as digital content. The DPSA 400 includes a services and/or applications layer (S/A layer) 420 (described in more detail with reference to FIG. 5); a storage area network layer (SAN layer) 430 (described in more detail with reference to FIG. 6); a digital asset management layer (DAM layer) 440 (described in more detail with reference to FIG. 7); and a enterprise applications integration and/or a business process automation layer 450 (EAI/BPA) (described in more detail with reference to FIG. 8).

Figure 5:
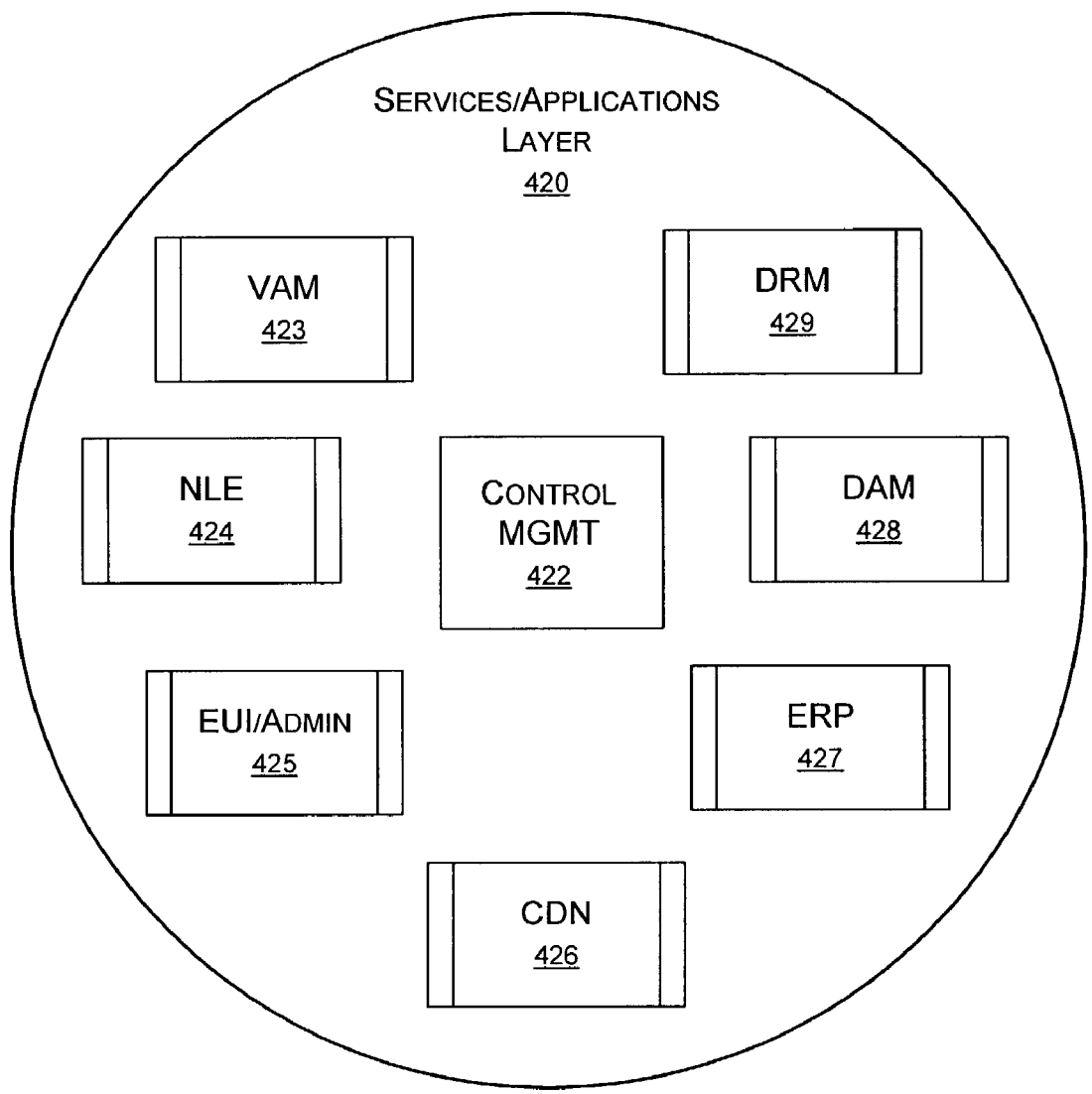
FIG. 5 is a block diagram illustrating an exemplary services and/or applications (S/A) layer.

Referring to FIG. 5, an exemplary services and/or applications layer 420 is shown. The exemplary S/A layer 420 is optionally platform agnostic. In general, platform agnostic infers that an S/A layer can operate with a wide variety of service and/or applications regardless of the underlying platform for which any particular service and/or application was built. The term "platform agnostic" does not necessarily infer that an S/A layer does not rely on a particular platform for implementation. For example, as described in more detail below, an exemplary S/A layer may rely on a WINDOWS® OS and/or the .NET™ framework (Microsoft Corporation, Redmond, Wash.). In this particular example, a DPSA may support the WINDOWS® OS and/or the .NET™ framework. Further, as described below, use of a framework may promote interoperability. In addition, as shown in FIG. 4, services and/or applications of the exemplary S/A layer 420 may overlap with other layers (e.g., layers 430, 440, 450).

Referring again to FIG. 5, the exemplary S/A layer 420 includes a control and/or management block 422, which, for example, optionally relies on a WINDOWS® OS and/or the .NET™ framework. Of course, other OSs and/or frameworks may also be suitable for use in a control and/or management block of an S/A layer. In an alternative, an S/A layer does not include a control and/or management block, for example, control and/or management of an S/A layer (or any application or service in the layer) may occur via another layer. In either case, services and/or applications are optionally described with a service definition language and/or registered in a registry. In the former case, the control and/or management block 422 may include service definition language descriptions of services and/or applications and/or a registry, while in the latter case, descriptions and/or a registry are maintained elsewhere in a digital production services architecture.

The exemplary S/A layer 420 also includes various services and/or applications, as shown in blocks 423–429. A video and/or audio metadata block (VAM) 423 includes services and/or applications related to VAM. A nonlinear editing block (NLE) 424 includes services and/or applications related to editing or nonlinear editing of content (e.g., digital video, etc.). An end user interface and/or administrator interface block (EUI/Admin) 425 includes services and/or applications for an enterprise and/or an administrator. A content distribution network block (CDN) 426 includes services and/or application for content distribution. An enterprise resource planning block (ERP) 427 includes services and/or application for enterprise resource planning. A digital asset management block (DAM) 428 includes services and/or applications related to management of digital assets (e.g., content, metadata, etc.). A digital rights management block (DRM) 429 includes services and/or applications related to the management of rights in digital content, metadata, etc.

According to the exemplary S/A layer 420, the various service and/or application blocks 423–429 do not necessary include services and/or applications built for a specific platform. Thus, a DRM block may be built for an APPLE® OS platform, a DAM block may be built for a WINDOWS® OS platform and a CDN block may be built for a UNIX OS platform. Hence, the exemplary S/A layer 420 is optionally platform agnostic in that it contains services and/or applications built for one or more platforms. In addition, the various services and/or application may include legacy, current and/or emerging services and/or applications.

The various services and/or applications in the S/A layer 420, and/or other layers, are optionally exposed on a network through a communication protocol, described with a network service definition language, and/or registered in a registry. In a particular S/A layer, communication protocols, descriptions, and/or registrations are controlled and/or managed by a control and/or management block.

Figure 6:
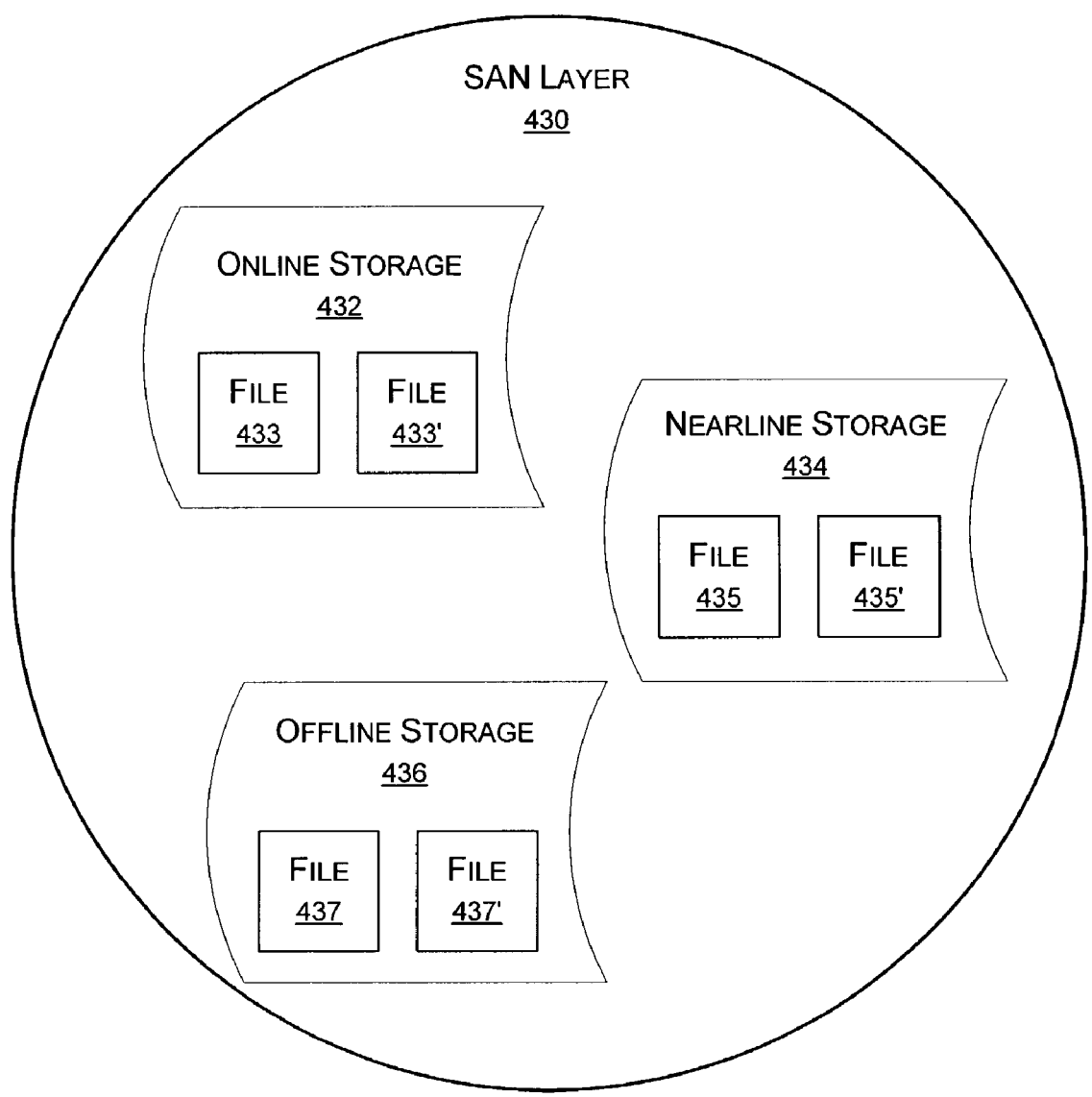
FIG. 6 is a block diagram illustrating an exemplary storage area network (SAN) layer.

Referring to FIG. 6, an exemplary SAN layer 430 is shown. The SAN layer 430 includes an online storage block 432, a nearline storage block 434 and/or an offline storage block 436. These three data storage blocks 432, 434, 436 are suitable for storing content, metadata, etc. Typically, within a storage block, data are stored in the form of a file. For example, as shown, online storage block 432 includes one or more files 433, 433'; nearline storage block 434 includes one or more files 435, 435', and offline storage block 436 includes one or more files 437, 437'. Of course, a SAN layer may include any particular arrangement of storage blocks and/or files that meets the needs of a scenario or scenarios.

The exemplary SAN layer 430 is optionally exposed as a unified storage (e.g., HFS) or storage service. As such, equipment or units associated with various stages can access the SAN layer as required. In addition, the exemplary SAN layer 430 optionally provides for synchronization for storage and/or requests. For example, an application in a S/A layer may request data from the SAN layer 430 according to certain synchronization requirements. In response, the SAN layer 430 cooperates with the synchronization requirements of the application. Further, the SAN layer 430 optionally provides for multiple accesses to a single file wherein one or more applications and/or services request access to the file at the same and/or relatively the same time. The SAN layer may facilitate optimized transport of data among resources in a network. For example, a SAN layer may include multithreaded copy capability and/or peer-to-peer detached direct copy using proxied authentication. Further, an exemplary digital production services architecture may implement such data movement processes as a framework service (e.g., a .NET™ service).

An exemplary SAN layer may also include database features. For example, an exemplary SAN layer optionally uses a WINDOWS® OS based file system and corresponding software to manage storage of data, location of data, and/or access to data. Of course, an exemplary SAN layer may have streaming capabilities to receive and/or transmit data in a suitable streaming format. Resources available to an exemplary SAN layer are optionally made available to local storage as well. Further, policies implemented within an exemplary SAN layer are optionally implemented within local storage. The availability of SAN layer resources and/or policies can further goals of interoperability, compatibility and/or extensibility of a digital production services architecture.

Figure 7:
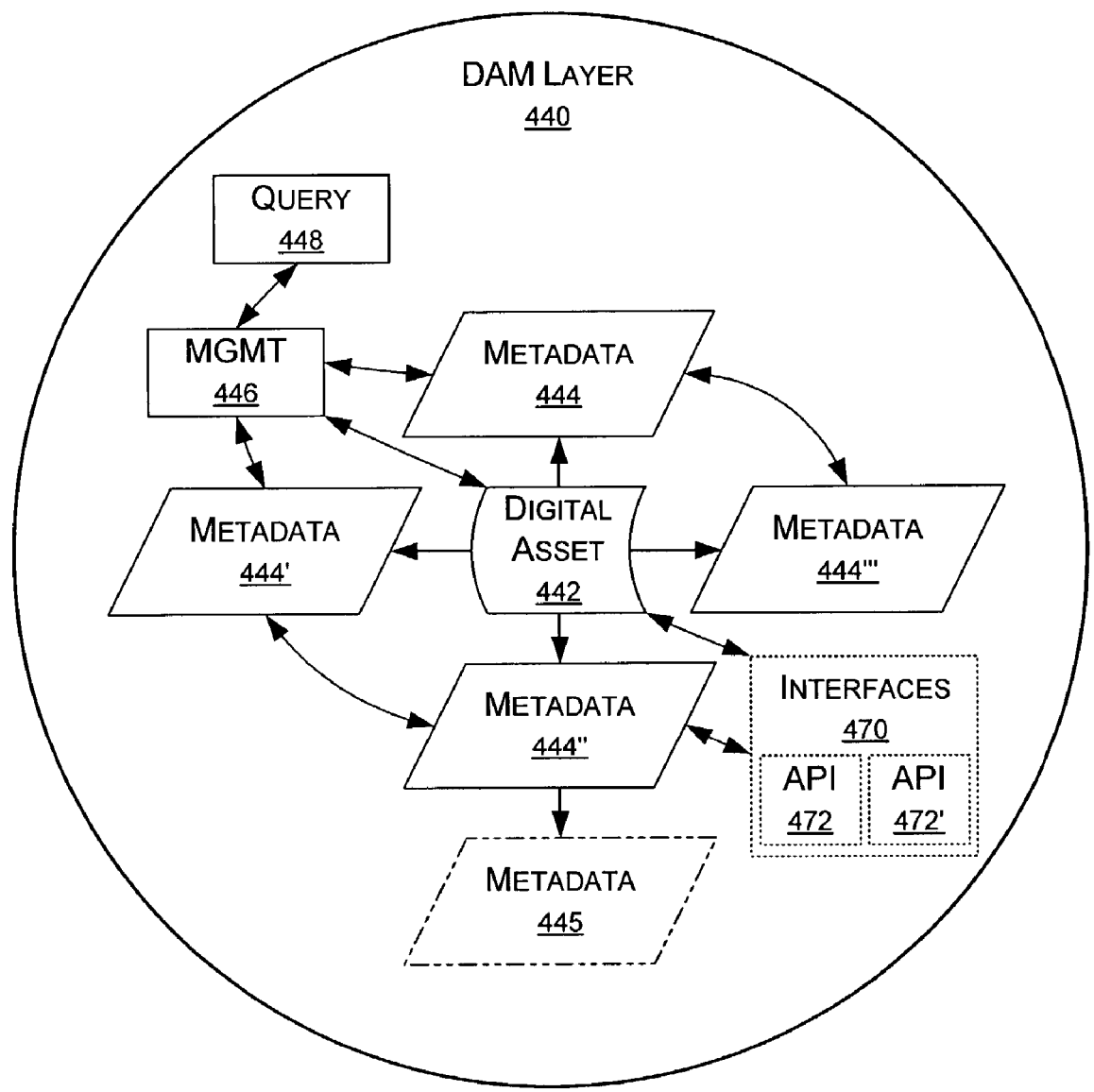
FIG. 7 is a block diagram illustrating an exemplary digital asset management (DAM) layer.

Referring to FIG. 7, an exemplary DAM layer 440 is shown. The DAM layer 440 includes one or more digital assets 442. The one or more digital assets 442 optionally have associated metadata 444, 444', 444", 444'''. The exemplary DAM layer 440 optionally includes a management block 446 capable of managing metadata 444 and/or digital assets 442. The management block 446 further optionally interacts with a query block 448, which provides, for example, query capabilities for digital assets 442 and/or metadata 444. In addition, the DAM layer 440 optionally includes secure metadata 445 and/or other secure digital assets. Further, the DAM layer 440 optionally operates in conjunction with an interface block 470 having one or more interfaces 472, 472'. The one or more interfaces 472, 472' are typically associated with an EAI/BPA layer (e.g., see the EAI/BPA layer 450 of FIG. 8).

In general, a DAM layer (e.g., the DAM layer 440) provides a robust extension of one or more file system hierarchies into multiple dimensions, organized, for example, according to taxonomies (e.g., standardized taxonomies). Expressions of taxonomies may occur via keyword hierarchies, controlled vocabularies in one or more user defined fields (UDFs), and/or in group/directory structures. An exemplary DAM layer may also facilitate transaction histories (e.g., audit trails) for assets and/or metadata. For example, a DAM layer may facilitate and/or allow for exploitation of rich metadata and media relationships to facilitate production workflows, content organization, security, reuse and preservation. A DAM layer may also allow for abstraction of digital assets from files into extended metadata, relationships, versioning, security, search and management capabilities.

Figure 8:
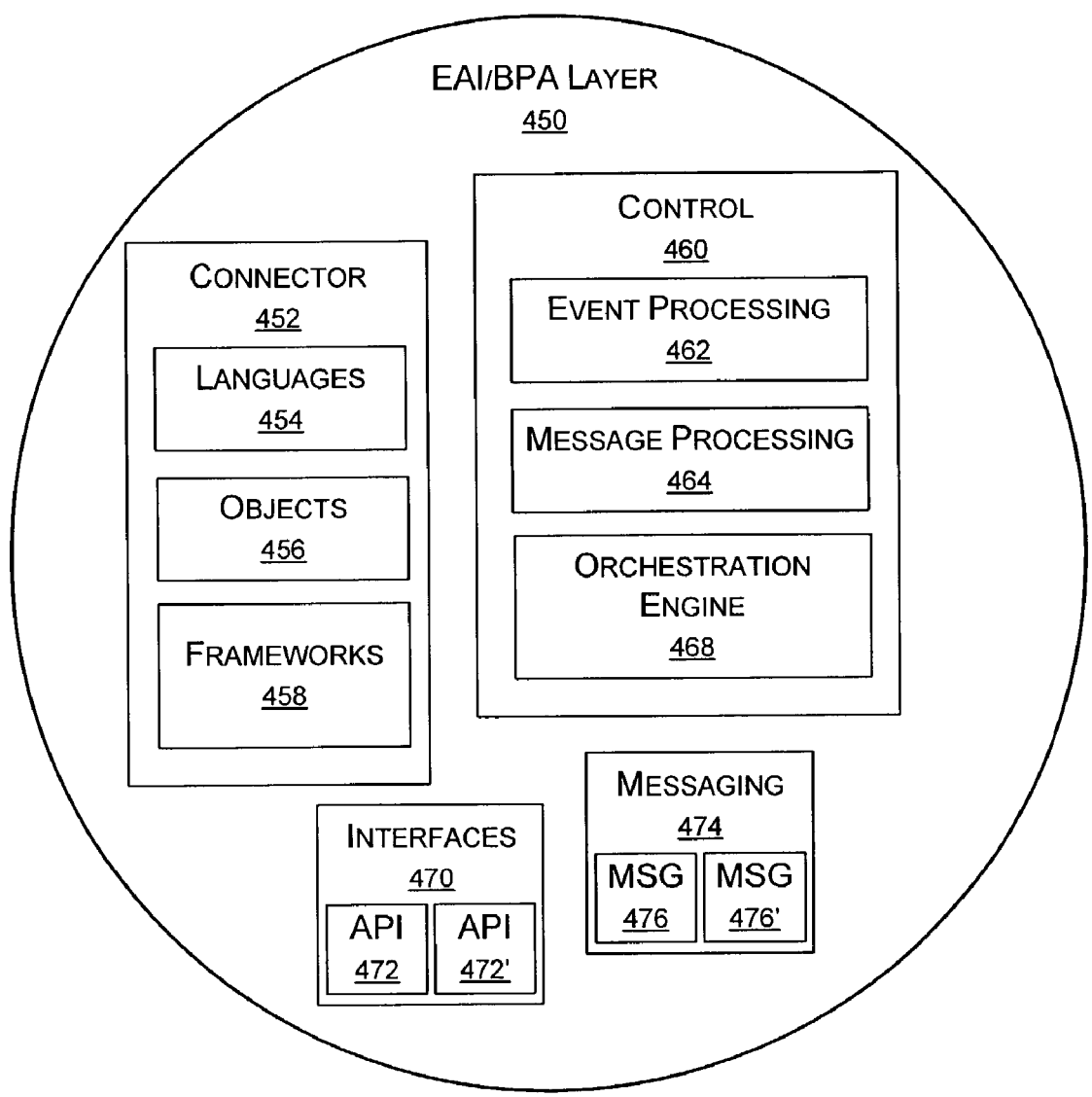
FIG. 8 is a block diagram illustrating an exemplary enterprise applications integration and/or business process automation (EAI/BPA) layer.

Referring to FIG. 8, an exemplary EAI/BPA layer 450 is shown. The EAI/BPA layer 450 includes a connector block 452, a control block 460, an interface block 470, and a messaging block 474. The connector block 452 includes one or more connectors for one or more languages 454, one or more objects 456, and one or more frameworks 458. Typically, the connector block 452 allows for easy to write connectors for a broad variety of methods, systems and/or devices participating in a digital production services scenario. The control block 460 includes an event processing block 462, a message processing block 464 and an orchestration engine 468. The interface block 470 includes one or more interfaces 472, 472', such as, but not limited to, application programming interfaces (APIs). The messaging block 474 includes one or more messages 476, 476'.

In general, an EAI/BPA layer introduces one or more mechanisms by which various paths in production workflow can be optimized, for example, by automating movement of data and/or execution of processes. Technologies such as those embodied in BIZTALK® software (Microsoft Corporation), .NET™ software, etc., allow for application of EAI/BPA layer principles in, for example, an inexpensive and/or flexible manner. Further, an EAI/BPA layer may allow for messaging, control, and interoperability wherein processing occurs in an asynchronous and/or a synchronous manner.

An exemplary EAI/BPA layer optionally provides for use of a common language runtime, SOAP, XML, MIME, HTML, etc. In addition, an exemplary EAI/BPA layer is optionally platform and/or language independent and optionally domain and/or object namespace oriented. Overall, an EAI/BPA layer may provide for an agile development environment that enhances and/or drives platform interoperability.

Figure 9:
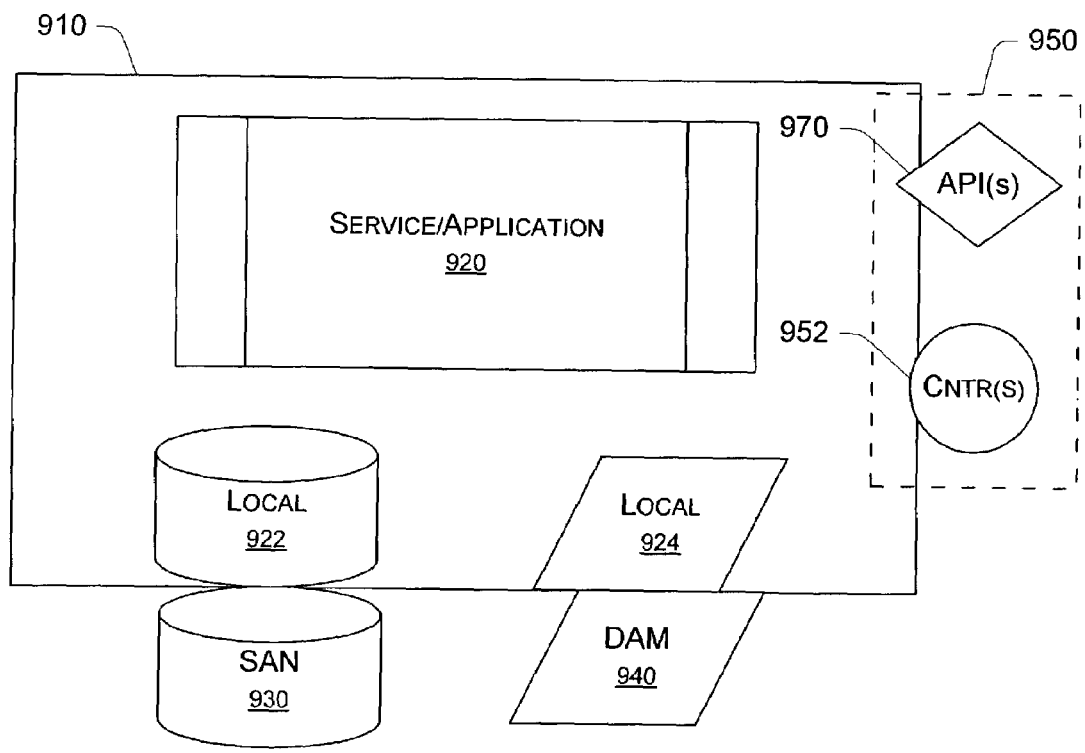
FIG. 9 is a block diagram illustrating an exemplary unit associated with S/A, SAN, DAM and EAI/BPA layers.

Referring to FIG. 9, an exemplary unit 910, suitable for use in a digital production environment (e.g., a stage, a scenario, etc.), is shown. The unit 910 includes a service and/or application 920, local storage 922 and local metadata 924. The exemplary unit 910 also includes various components associated with one or more of the aforementioned layers. For example, a SAN layer 930 operates in conjunction with the local storage 922, a DAM layer 940 operates in conjunction with the local metadata 924, and EAI/BPA layer components 950, such as, but not limited to, one or more interfaces 970 (e.g., APIs) and/or connectors 952 (e.g., BIZTALK® connectors). The schematic exemplary unit 910 is used to further describe scenarios and/or systems that implement a multilayer digital production services architecture.

Figure 10:
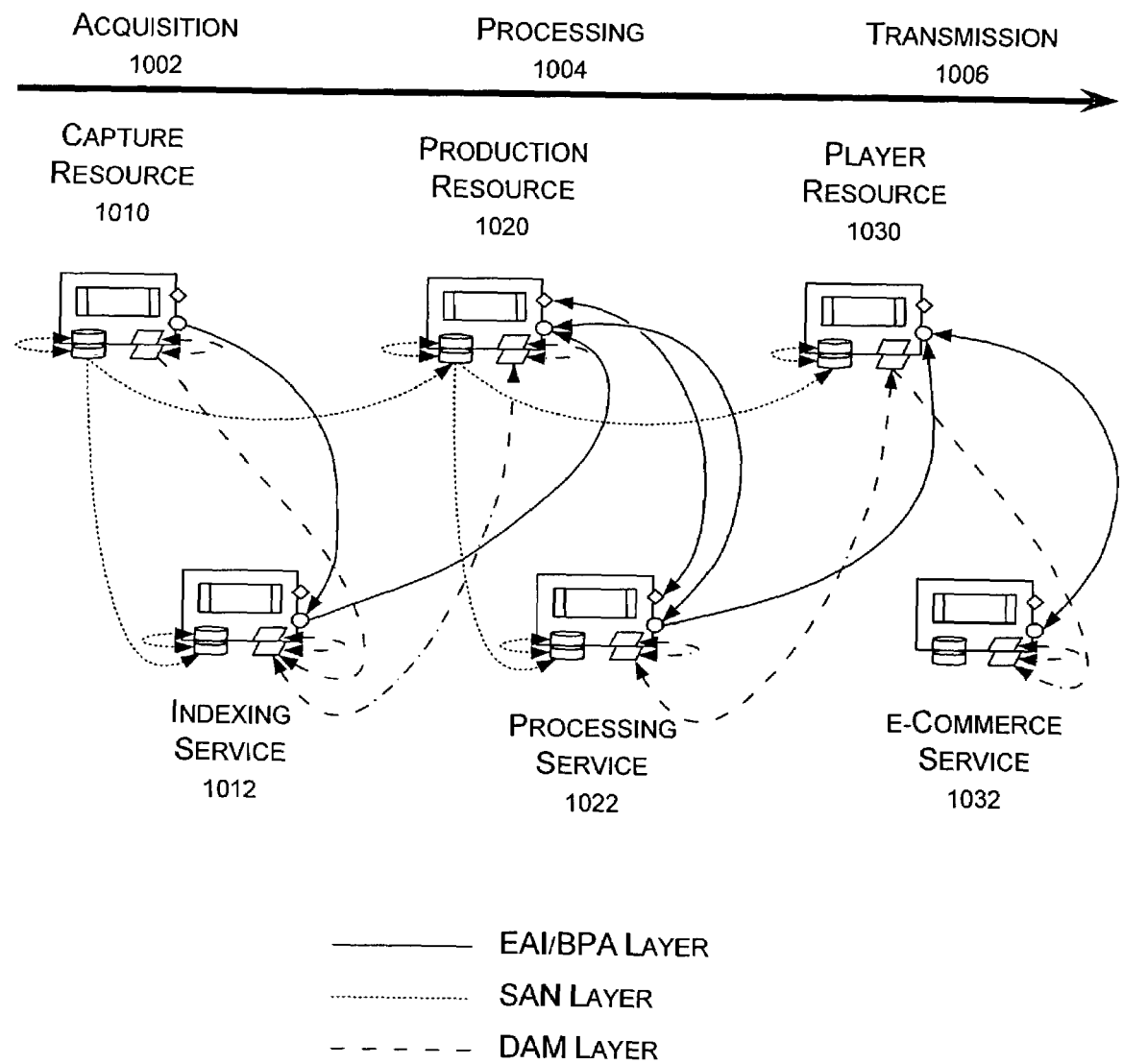
FIG. 10 is a block diagram illustrating an exemplary scenario that implements an exemplary digital production services architecture.

Referring to FIG. 10, a flow diagram of an exemplary digital production services scenario 1000 having various exemplary units 1010, 1012, 1020, 1022, 1030, 1032, in several stages 1002, 1004, 1006, is shown. Various inter-layer and/or intra-layer links, which are associated with S/A, SAN, DAM and EAI/BPA layers, are also shown linking the exemplary units 1010, 1012, 1020, 1022, 1030, 1032, which are generally associated with an S/A layer.

The acquisition stage 1002 includes a capture resource unit 1010 and an indexing service unit 1012 in a S/A layer. The capture resource unit 1010 optionally includes services and/or applications for acquiring digital video and/or other data. The capture resource unit 1010 has links between local storage and SAN layer storage as well as between local metadata and DAM layer metadata. Once local storage and/or local metadata of the capture resource unit 1010 are available to the SAN layer and/or DAM layer, then the information (e.g., content and/or metadata) is optionally available to other units, as needed. For example, the indexing service unit 1012 has access to information from the capture resource unit 1010 via the SAN layer and/or DAM layer, as shown by the various inter-layer and intra-layer lines. The EAI/BPA layer allows for communication between the capture resource unit 1010 and the indexing services unit 1012 via connectors. For example, the capture resource unit 1010 and the indexing service unit 1012 optionally have BIZTALK® connectors to facilitate communication of information. According to this scenario 1000, once the acquisition stage 1002 has captured and/or indexed at least some digital content and/or metadata, processing of the digital content and/or metadata may commence in the processing stage 1004. Of course, an exemplary scenario and/or architecture may process content and/or metadata in a streaming manner in real-time. Further, protocols such as WMF, AAF and/or MXF typically support inclusion of structured metadata and/or control objects in-line with essence (media payload) data.

The processing stage 1004 includes the production resource unit 1020 and the processing service 1022. The production resource unit 1020 and the processing service unit 1022 include inter-layer links between local storage and SAN layer storage and between local metadata and DAM layer metadata. The EAI/BPA layer allows for communication between the production resource unit 1020 and the processing service unit 1022 via connectors and/or interfaces. For example, the production resource unit 1020 and the processing service unit 1022 optionally have BIZTALK® connectors and/or .NET™ APIs to facilitate communication of information. According to this scenario 1000, once the production stage 1004 has processed at least some digital content and/or metadata, transmission of the digital content and/or metadata may commence in the transmission stage 1006.

The transmission stage 1006 includes a player resource unit 1030 and an e-commerce service unit 1032. In this example, the player resource unit 1030 has transmission capabilities for transmitting video whereas the e-commerce service unit 1032 optionally supports enterprise resource planning (e.g., SAP and/or MICROSOFT® Great Plains implementations). The player resource unit 1030 includes an inter-layer link between its local storage and the SAN layer storage and the e-commerce service layer 1032 includes an inter-layer link between its local metadata and the DAM layer metadata. The EAI/BPA layer allows for communication between the player resource unit 1030 and the e-commerce service unit 1032 via connectors. For example, the player resource unit 1030 and the e-commerce service unit 1032 optionally have BIZTALK® connectors to facilitate communication of information.

Figure 11:
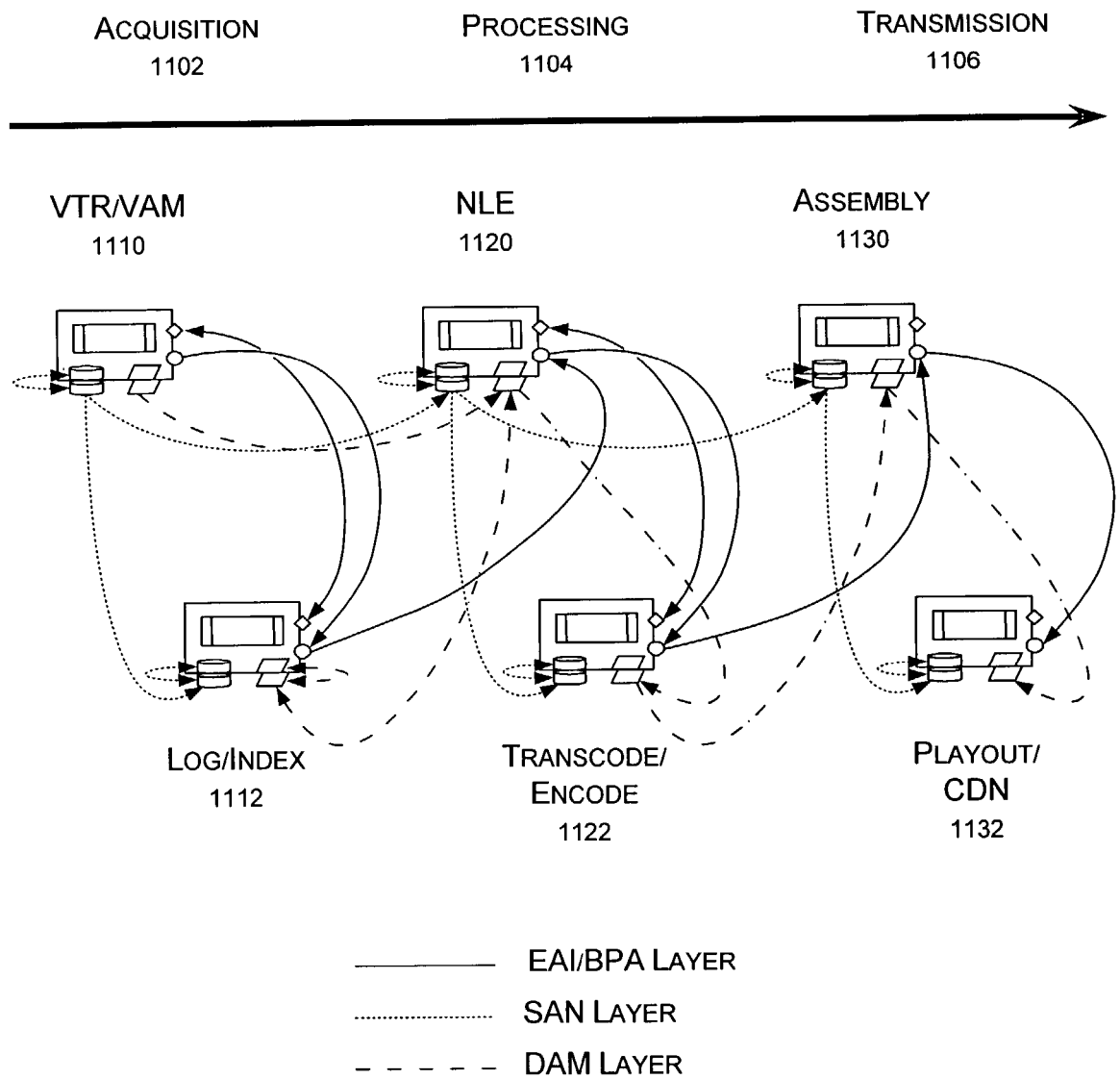
FIG. 11 is a block diagram illustrating another exemplary scenario that implements an exemplary digital production services architecture.

Referring to FIG. 11, a flow diagram of an exemplary digital production services scenario 1000 having various exemplary units 1110, 1112, 1120, 1122, 1130, 1132, in several stages 1102, 1104, 1106, is shown. Various inter-layer and/or intra-layer links, which are associated with S/A, SAN, DAM and EAI/BPA layers, are also shown linking the exemplary units 1110, 1112, 1120, 1122, 1130, 1132, which are generally associated with an S/A layer.

The acquisition stage 1102 includes a VTR/VAM unit 1110 and a logging and/or indexing unit 1112 in a S/A layer. The VTR/VAM unit 1110 has an intra-layer link between local storage and SAN layer storage. Once local storage and/or local metadata of the VTR/VAM unit 1110 are available to the SAN layer and/or DAM layer, then the information (e.g., content and/or metadata) is optionally available to other units, as needed. For example, the logging and/or indexing unit 1112 has access to information from the VTR/VAM unit 1110 via the SAN layer, as shown by the various inter-layer and intra-layer lines. The EAI/BPA layer allows for communication between the VTR/VAM unit 1110 and the logging and/or indexing unit 1112 via connectors and/or interfaces. For example, the VTR/VAM unit 1110 and the logging and/or indexing unit 1112 optionally have BIZTALK® connectors and/or .NET™ APIs to facilitate communication of information. According to this scenario 1100, once the acquisition stage 1102 has loaded and/or logged and/or indexed at least some digital content and/or metadata, processing of the digital content and/or metadata may commence in the processing stage 1104.

The processing stage 1104 includes the NLE unit 1120 and the transcode/encode unit 1122. The NLE unit 1120 and the transcode/encode unit 1122 include inter-layer links between local storage and SAN layer storage. The EAI/BPA layer allows for communication between the NLE unit 1120 and the transcode/encode unit 1122 via connectors and/or interfaces. For example, the VTR/VAM unit 1120 and the transcode/encode unit 1122 optionally have BIZTALK® connectors and/or .NET™ APIs to facilitate communication of information. According to this scenario 1100, once the production stage 1104 has processed at least some digital content and/or metadata, transmission of the digital content and/or metadata may commence in the transmission stage 1106.

The transmission stage 1106 includes an assembly unit 1130 and a playout/CDN unit 1132. The assembly unit 1130 and the playout/CDN unit 1132 include inter-layer links between their local storage and the SAN layer storage. The EAI/BPA layer allows for communication between the assembly unit 1130 and the playout/CDN unit 1132 via connectors. For example, the assembly unit 1130 and the playout/CDN unit 1132 optionally have BIZTALK® connectors to facilitate communication of information.

Figure 12:
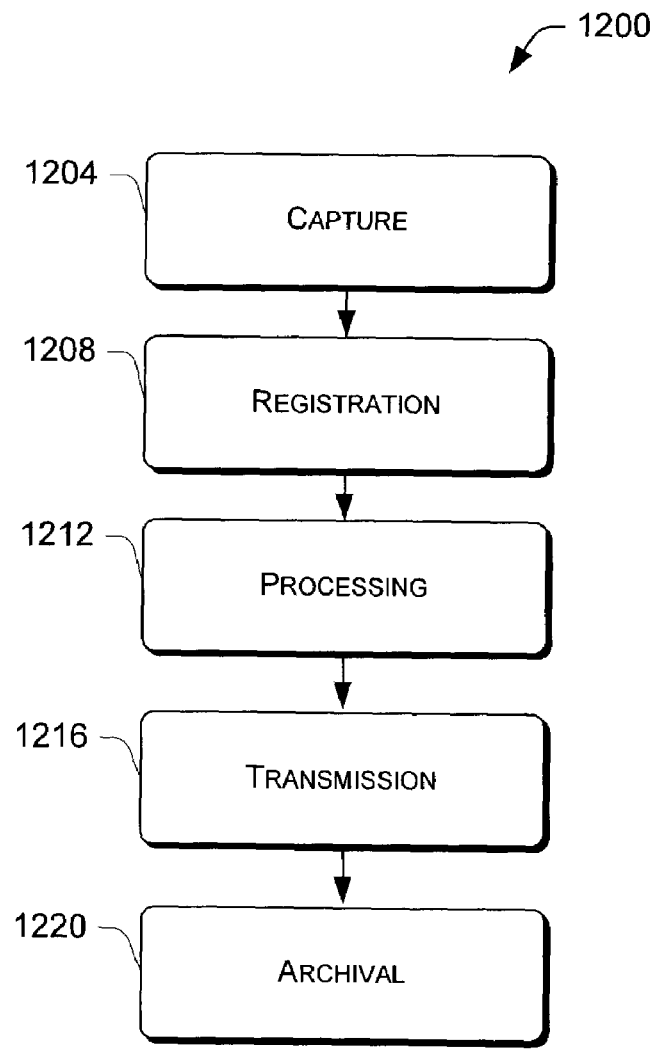
FIG. 12 is a block diagram illustrating an exemplary method according to a media scenario that implements an exemplary digital production services architecture.

Referring to FIG. 12, an exemplary method 1200 is shown. The exemplary method 1200 includes a capture block 1204, a registration block 1208, a processing block 1212, a transmission block 1216 and an archival block 1220. Various blocks optionally operate as stages, such as those described above, and form part of a digital production services scenario. While the exemplary method 1200 is shown generally, a specific example is described below with reference to the various blocks 1204–1220.

In the capture block 1204, an AV source is switched to a VTR/VAM appliance wherein record/capture is initiated by operator and/or automation. The VTR/VAM appliance writes the digitized AV stream with timecode and potentially additional metadata to local fixed and/or removable media (tape, disk, and/or network, etc.). In addition, in the capture block 1204, performs scene detection using an algorithm to demarcate an input stream into clip segments (e.g., EDL generated).

In the registration block 1208, HFS data movement policies automatically initiate lazy copy (e.g., background synchronization) of clip data from a local VAM appliance disk storage to SAN. The clip data is ingested into a DAM layer via a BPA layer and/or DAM layer integration as a new asset with initial metadata (e.g., using a format as described below).

In the processing block 1212, a BPA layer event triggers routing of the new clip data through a video indexing service for extraction of additional metadata which in turn updates existing record(s) in DAM layer. The indexing service processes a SAN copy of the clip via DAM reference. According to this example, failover to original VAM/VTR copy is automatic via redundant locater data if SAN or DAM faults on reference. Further, the clip data is routed through a transcode engine to conform video data or metadata for compatibility with downstream resources (e.g., conversion from a WINDOWS MEDIA™ format to an AVID™ internal editing format, etc.). In this scenario, clip data (e.g., content) and metadata are marshaled per production requirements at each successive processing resource (e.g., NLE system) via BPA logic, etc. Control events and messaging are, for example, routed via BIZTALK® software, metadata via a DAM layer, and content via a SAN layer. Processing resources may be tightly or loosely organized in a digital production services architecture to further facilitate automation or scaling of processing capabilities. An NLE system, for example, might take advantage of .NET™ framework integration to facilitate distributed digital effects rendering, etc. In this scenario, control, metadata and content data may be passed directly via .NET™ framework interfaces (e.g., APIs, etc.) through a network(s).

In the exemplary method 1200, as processes are executed, either under automation or operator control, the digital production services architecture optionally facilitates security management, versioning, archival as well as capture of new metadata as it is generated in the workflow. In addition, the exemplary method 1200, optionally facilitates (e.g., orchestrates, etc.) quality control monitoring to ensure operational integrity typical of a production environment.

In general, prior to the transmission block 1216, numerous production elements have been processed into a "product" suitable for distribution through one or more channels. In a simple case, distribution is through a player appliance. A more complex and typical scenario might allow for automated playout to "air" of content, either according to a pre-programmed playlist or on-demand via a CDN. Of course, the transmission block 1216 optionally allows for implementation of DRM policies in BPA layer wherein operating against metadata in a DAM layer may manage access to content.

The transmission block 1216 may further provide for integration with a CDN (content distribution network) for broad Intranet/Internet access to produced content using DAM layer metadata to and BPA layer logic to intelligently route data for federated access to thereby help minimize network distribution costs/risks. In addition, integration with an ERP system via a BPA layer enables business management for purposes of revenue generation, cost management, licensing, contract management, etc. Overall, automation of distributed quality control monitoring and/or reporting may ensure operational integrity through transmission (e.g., in transmission block 1220) and/or archival (e.g., in archival block 1220).

In the archival block 1220, automatic migration optionally occurs of key production and final elements to long term, archival storage according to policies implemented at SAN, DAM and EAI/BPA layers. For example, HSM policies in a SAN layer migrate content from online (disk based) storage to less expensive nearline (tape library) based storage and ultimately to offline storage. The DAM layer optionally preserves all associated metadata, including project, usage and security tags for consistent query and retrieval at any date in the future. The EAI/BPA layer optionally facilitates the integration of contracts, DRM and ERP systems for intellectual property management purposes.

Figure 13:
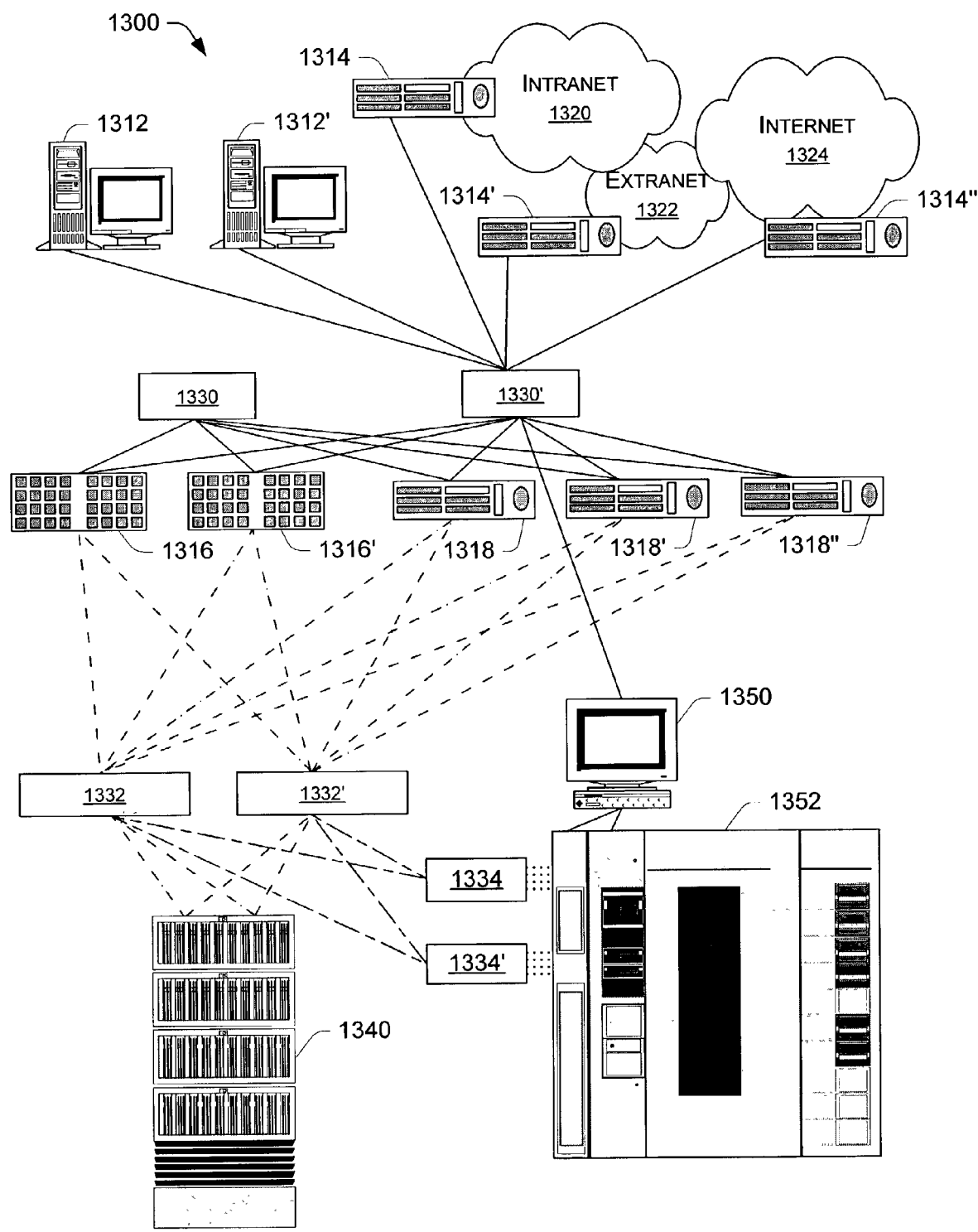
FIG. 13 is a block diagram illustrating an exemplary system suitable for implementing an exemplary digital production services architecture.

Referring to FIG. 13, an exemplary system 1300 capable of implementing a digital production services architecture is shown. While a variety of specific, non-limiting, commercially available technologies are described with reference to the exemplary system 1300, other legacy, current and/or emerging technologies may also be used. Near the top at of FIG. 13, several remote and/or local computers are shown, for example, computers 1312, 1312' and networks 1320, 1322, 1324. The computers 1312, 1312' are terminals, workstations, computing devices, etc. The network 1320 represents an intranet, the network 1322 represents an extranet, and the network 1324 represents the Internet or other equivalent widely-based network. Each of the networks 1320, 1322, 1324 have one or more communication links to a server, for example, the servers 1314, 1314', 1314".

The servers 1314, 1314', 1314" are optionally Internet Information Services (IIS) servers. For example the commercially available ISS 5 server is a mature, high-performance WINDOWS® 2000 OS-based server suitable for use in the system 1300. Various commercially available COMPAQ® servers are optionally WINDOWS® OS-based and suitable for use as ISS servers. For example, the COMPAQ® Proliant DL380 G2 server is marketed as a space saving, high performance, full-featured 2U rack server designed to meet the needs of Internet Service Providers, corporate data centers and remote sites.

The servers 1314, 1314', 1314" and the computers 1312, 1312' have communication links with one or more switches 1330, 1330'. Commercially available switches that are suitable for use in the system 1300 optionally include the Extreme Networks, Inc. (Santa Clara, Calif.) Black Diamond or Summit series switches, which have a variety of port configurations (e.g., 10/100 Mbps Ethernet ports, full-duplex fixed 1000Base-T or GBIC-based SX, LX or LX-70 Ethernet ports at wirespeeds up to 10 gigabits/sec.). The Black Diamond 6816 core switch has a 256 Gbps non-blocking switch fabric and a forwarding rate of 128 million packets per second. Extreme Network, Inc.'s switches optionally include wire-speed Layer 2 and wire-speed basic Layer 3 switching using static routing or V1/V2 routing information protocols (RIPs). Of course, a switch may operate with full Layer 3 switching that includes support for protocols such as, but not limited to, OSPF (open shortest path first), DVMRP (distance-vector routing protocol), PIM (protocol independent multicast) and IPX (internetwork packet exchange) routing of multiple encapsulation types.

In the exemplary system 1300, the switches 1330, 1330' have communication links to additional servers 1316, 1316' and/or disk extenders 1318, 1318'. The additional servers 1316, 1316' are optionally database servers. For example, the servers are optionally database servers such as the commercially available SQL SERVER™ 2000 server (Microsoft Corporation, Redmond, Wash.). The SQL SERVER™ 2000 server provides agility to data management and analysis. From a data management and analysis perspective, such a server, as implemented in an exemplary DPSA, helps turn raw data into business intelligence. The SQL SERVER™ 2000 server also facilitates generation of enterprise-class business applications and further provides support for Extensible Markup Language (XML). The SQL SERVER™ 2000 server is suitable for use in database applications such as, but not limited to, Customer Relationship Management (CRM), Business Intelligence (BI), Enterprise Resource Planning (ERP), and other line-of-business application vendors and customers due, in part, to performance, scalability, manageability, programmability and value.

The SQL SERVER™ 2000 server may also operate as a component of an enterprise server. For example, the SQL SERVER™ 2000 server optionally operates as a component of a .NET™ enterprise server. A .NET™ enterprise server can help reduce the time required to bring e-commerce, line-of-business, and data warehousing applications to market while offering the scalability needed for demanding environments. In the exemplary system 1300, one or more of the servers 1316, 1316' are optionally enterprise servers.

Overall, the SQL SERVER™ 2000 server includes rich support for XML and HTTP; performance and availability features to partition load and ensure uptime; and advanced management and tuning functionality to automate routine tasks and lower total cost of ownership. Additionally, SQL SERVER™ 2000 server takes full advantage of the WINDOWS® 2000 OS, including support for the ACTIVE DIRECTORY™ service, and up to 32 processors and 64 GB of RAM, of course even higher limits are available with a 64-bit version of the SQL SERVER™ 2000 server.

Besides providing the necessary enterprise "abilities" for data management and analysis, SQL SERVER™ 2000 server helps deliver agility. Agility is a characteristic of organizations that can rapidly adapt to changing environments for competitive advantage. By going beyond simple data storage and/or retrieval and offering true business intelligence functionality, SQL SERVER™ 2000 server may allow a business to understand better data and act decisively on analysis results. Such features are optionally implemented in the exemplary system 1300 in conjunction with a digital production services architecture.

As already mentioned, the exemplary system 1300 further includes one or more disk extenders 1318, 1318', 1318". Suitable commercially available disk extenders include those marketed by OTG Software. For example, the DiskXtender 2000 device (DX2000 device) aids in online storage and access of enterprise data. More specifically, the DX2000 device can help access data from computers, intranets, extranets and/or the Web. The DX2000 device can also extend WINDOWS® 2000 OS-based storage management capabilities to provide true remote storage. The DX2000 device further allows for fast and efficient access to data no matter where it is stored (e.g., users and/or storage-intensive applications can easily and transparently retrieve data from nearly any storage media). Other features of the DX2000 device allow for storage of data on the most appropriate media to meet storage, access, and retention requirements, optionally without administrator and/or operator intervention; an ability to turn any NTFS volume into an infinite disk for data storage; an ability to manage data automatically, based on configurable rules for migration, storage and retention; an ability to intelligently migrate less frequently accessed files to near-line media, providing faster backup and better data protection; an ability to automate diagnostic features that help detect error conditions; and an ability to automate media copy and media restore features ensure swift data recovery. The DX2000 device also supports services such as OTG Software, Inc.'s MediaStor software (OTG Software, Inc. is now owned by Legato Systems, Inc., Mountain View, Calif.), STORAGETEK® ACSLS (see below), IBM Corp.'s (Armonk, N.Y.) TIVOLI® TSM software, and RAID or network attached storage (NAS) devices.

The disk extenders 1318, 1318', 1318" optionally support a variety of media, such as, but not limited to, WORM (e.g., 5.25" and 12"); erasable optical (e.g., 5.25" and 12"); tape (e.g., DLT, AIT, STK 9840, 8 mm DAT, etc.); DVD-RAM; DVD-ROM; and CD-ROM.

In the exemplary system 1300, the servers 1316, 1316' and the disk extenders 1318, 1318', 1318" include communication links to one or more additional switches 1332, 1332'. The switches 1332, 1332' optionally include fiber channel (FC) switches. Commercially available FC switches include STORAGEWORKS® (Compaq Corp., Houston, Tex.) FC Storage Switch 8 and FC Storage Switch 16 are 8- and 16-port FC switches that enable high-speed, high-bandwidth, secure connections for SANs. The switches 1332, 1332' optionally provide for FC switched fabric solutions. Commercially available FC technologies include, but are not limited to, the Brocade Communications Systems, Inc.'s (San Jose, Calif.) SILKWORM® family of FC switched fabric solutions with port densities ranging from 8 to 128 ports supporting mixed 1 Gbps and 2 Gbps connectivity. These FC-based technologies may also support switched SANs.

In the exemplary system 1300, the FC switches 1332, 1332' have communication links with one or more SAN and/or DAM components, such as the storage array 1340. Suitable commercially available storage arrays include, but are not limited to, the RA8000 (Compaq Corp., Houston, Tex.), the ESA 12000 (Compaq Corp.) and CLARiiON (EMC Corp., Hopkinton, Mass.) arrays. For example, the CLARiiON FC4700 array is a full FC array suitable for a broad spectrum of applications, from OLTP to Web servers to data warehousing. Features of the FC4700 array include disk scrubbing and cache destaging; an ability to generate multiple, point-in-time snapshots of data enabling faster, non-disruptive online backups and simplified restore processes with EMC Corp.'s SnapView software; and an ability to ensure business continuity during a disaster with EMC Corp.'s MirrorView software, which provides bullet-proof, local and remote mirroring for immediate site failover. Overall, an array typically allows for scalability through addition of drives and controllers. For example, the FC4700 array scales up to 200K I/Os in a single cabinet and up to 21.7 TB. Of course, other suitable SAN devices may also be used.

The switches 1332, 1332' also include one or more communication links to one or more bridges 1334, 1334'. For example, a FC switch optionally has a communication link to a FC to SCSI bridge, which also operates as a SCSI to FC bridge. Such a bridge allows a non-FC storage device to store data communicated from a FC switch, etc. For example, the exemplary system 1300 includes a library storage device 1352 having one or more interfaces (e.g., the computer 1350, the one or more FC-SCSI bridges, etc.). Suitable library devices include the Storage Technology Corp. (Louisville, Colo.) STORAGETEK® WOLFCREEK™ 9360 tape library, which provides automated shared storage to a wide variety of open and/or proprietary operating environments (e.g., platforms, frameworks, etc.). The WOLFCREEK™ 9360 tape library can perform up to 350 exchanges per hour. The WOLFCREEK™ 9360 tape library has a capacity of approximately 1,000 tape cartridges. Of course, the exemplary system 1300 optionally includes one or more FC arrays, library devices, etc., to provide even greater capacity. According to an exemplary digital production services architecture, such a system optionally operates one or more storage devices as a single storage system. In contrast, an exemplary system optionally has lesser capacity (e.g., fewer storage devices, FC only, library only, etc.). The WOLFCREEK™ 9360 tape library also supports various tape drives (LTO, DLT8000, 9840 (performance-centric) and T9940 (capacity-centric) models, etc.).

Various STORAGETEK™ libraries support either 'direct attached' or 'network attached' operation optionally utilizing ACSLS™ software for library control and management. ACSLS™ software optionally functions as a central service provider for all library operations and can efficiently share library resources with most applications on most systems. ACSLS™ client libraries for communication and control of a library are provided for several enterprise platforms (e.g., WINDOWS®, etc.).

Figure 14:
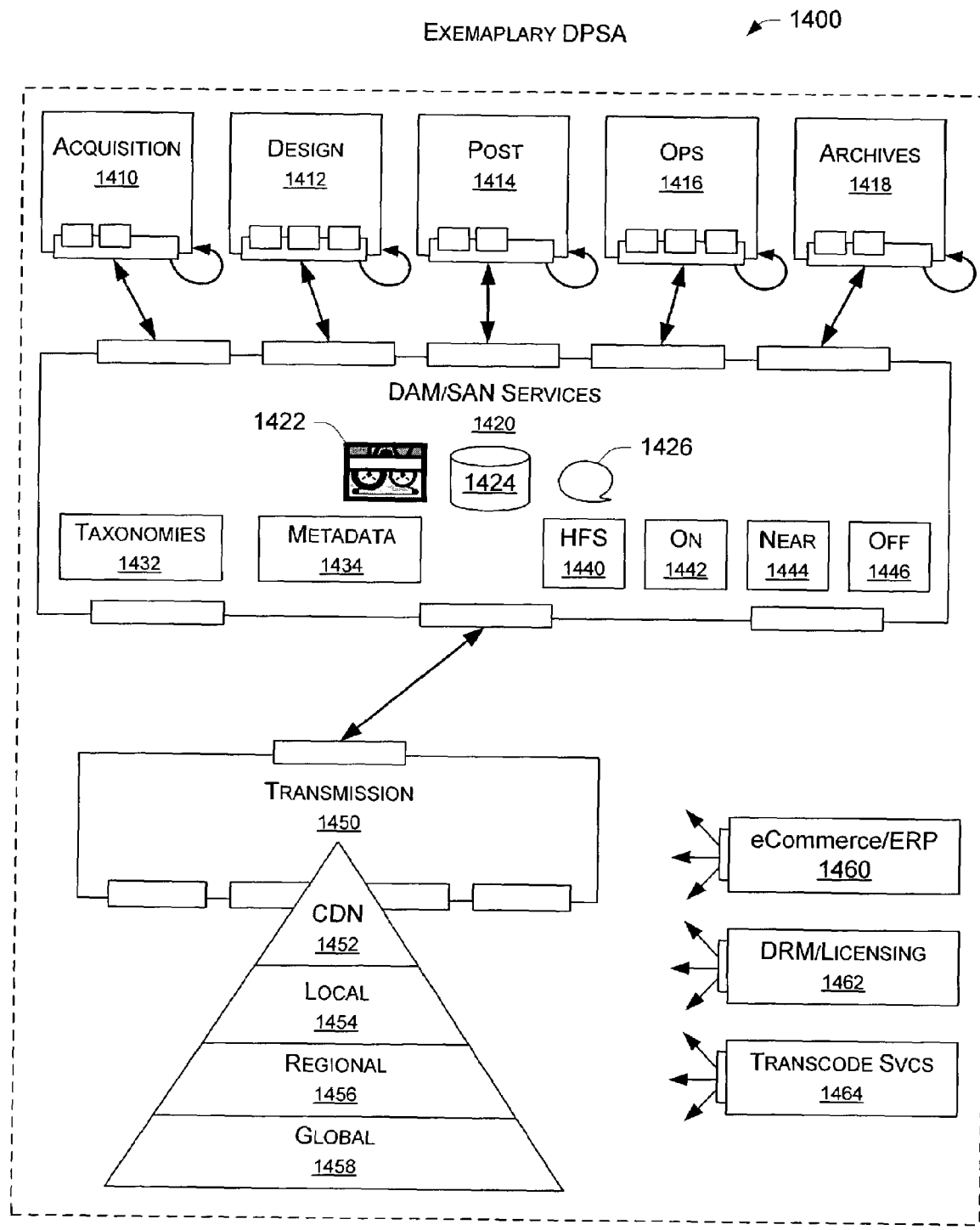
FIG. 14 is a block diagram illustrating an exemplary system having an exemplary digital production services architecture.

Referring to FIG. 14, an exemplary digital production services architecture 1400 is shown. According to the exemplary architecture 1400, various activity blocks 1410–1418 may operate autonomously using local resources according to specific workflow or business requirements. For example, an acquisition block 1410 may acquire essence data, a design block 1412 may design content, a post-production block 1414 may add post-production metadata, an operation block 1416 may coordinate on-line operations related to content distribution, and an archives block 1418 may archive essence and/or other data. The various activity blocks 1410–1418 may act as sources and/or destinations for content. Further, as shown, each of the activity blocks 1410–1418 include one or more connectors that can allow each block to share essence, metadata and/or control data with peer and/or other units.

The activity block 1410–1418 include communication links to a DAM/SAN layer services block 1420. The DAM/

SAN block 1420 includes one or more storage capabilities, such as, tape 1422 and database 1424. Further, the DAM/SAN block 1420 includes query capabilities as represented by the query block 1426. The DAM/SAN block 1420 also includes taxonomies 1432 and metadata 1434 while various functional blocks 1440–1446 allow for filesystem 1440, on-line 1442, near-line 1444, and off-line 1446 operations.

A BPA/EAI layer orchestration (not shown) can permeate such an architecture 1400 to, for example, facilitate processing of events, movement of information and initiation of tasks.

The DAM/SAN layer 1420 has a communication link to a transmission block 1450, wherein content is typically 'picked' and/or 'packed' from SAN/DAM block 1420 and handed off together with metadata 'hints' for transmission to a CDN block 1452. The CDN block 1452 tops a pyramid that acknowledges scale, scope issues/requirements implicit to local 1454, regional 1456, and/or global distribution 1458 of content (essence, metadata, etc.).

Additional service blocks 1460–1462 provide scheduling, transcode, DRM, monitoring, reporting, commerce, ERP and other services to augment or facilitate operations. For example, the e-commerce/ERP service block 1460 may provide support for e-commerce and enterprise operations, the DRM/Licensing block 1462 may provide support for maintaining licenses for content, and the transcode block 1464 may provide support for transcoding information.

Figure 15:
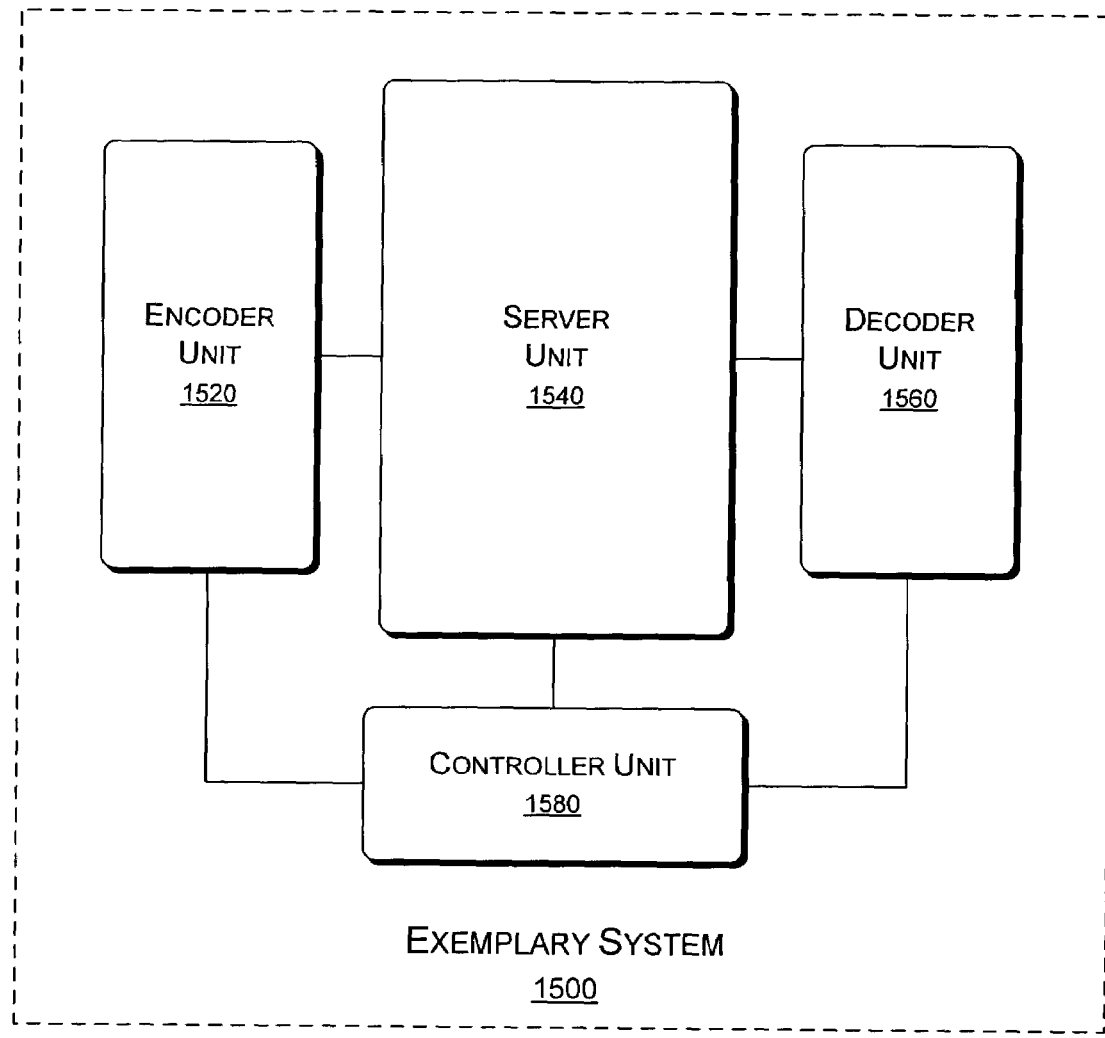
FIG. 15 is a block diagram illustrating an exemplary system having various units, such as, but not limited to, the unit illustrated in FIG. 9.

Referring to FIG. 15, a block diagram of an exemplary system 1500 is shown. The exemplary system 1500 includes hardware and software to allow for a variety of tasks, such as, but not limited to, input of video, compression of video, storage of video, decompression of video and output of video. Note that throughout the description herein, video optionally includes audio. To accomplish the aforementioned tasks, the exemplary system 1500 includes an encoder unit 1520, a server unit 1540, a decoder unit 1560 and a controller unit 1580. As shown in this exemplary system 1500, communication links exist between the various units 1520, 1540, 1560 and 1580. In particular, the controller unit 1580 allows for control of the encoder unit 1520, the server unit 1540 and the decoder unit 1560.

The exemplary system 1500 also includes one or more serial digital interfaces (or digital serial interfaces), which include a digital interface for receiving and/or transmitting standard and/or non-standard digital video data. In general, a network I/O and/or a SDI/SDTI is capable of communicating digital video data at a variety of bit rates according to standard and/or non-standard communication specifications. For example, an SDI/SDTI optionally communicates digital video data according to an SMPTE specification (e.g., SMPTE 259, 292, 304, etc.). The SMPTE 259M specification states a bit rate of approximately 270 Mbps and the SMPTE 292M specification states a bit rate of approximately 1.5 Gbps, while the SMPTE 304 specification is associated with a serial digital transport interface ("SDTI"). A network I/O optionally communicates digital video data according to a 100-Base-T specification (e.g., approximately 100 Mbps). Of course, a variety of other suitable network interfaces also exist, e.g., 100VG-AnyLAN, etc., some of which may be capable of bit rates lower or higher than approximately 100 Mbps. Analog signals and/or digital data received and/or transmitted by the exemplary system 1500 optionally include timing, audio and/or other information related to video signals and/or data received. In addition, the exemplary system 1500 includes protocols to assist in complying with various transmission protocols, such as, but not limited to, those associated with the aforementioned network and/or SMPTE specifications.

Figure 16:
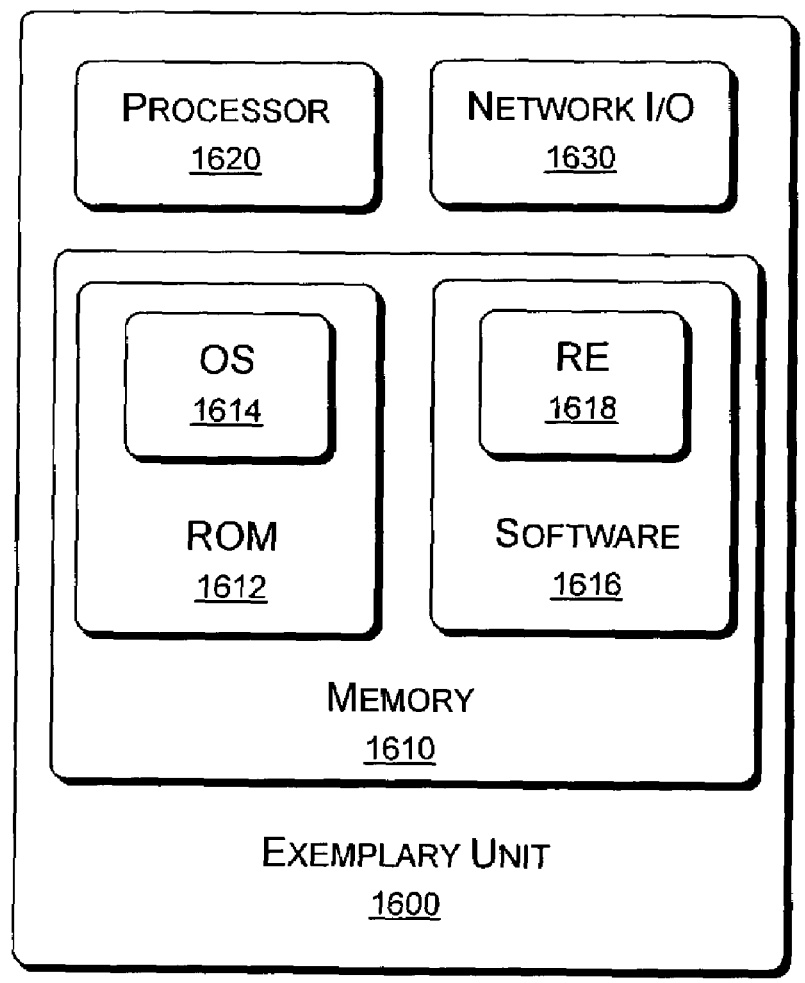
FIG. 16 is a block diagram illustrating an exemplary unit having a runtime engine.

Referring to FIG. 16, an exemplary unit 1600 suitable for use in the system 1500 of FIG. 15 and/or other systems. The exemplary unit 1600 includes memory 1610, a processor 1620 and a network I/O 1630. The memory 1610 includes, for example, ROM 1612, RAM, etc. The memory 1610 is suitable for storing software 1616, such as, but not limited to, runtime engine (RE) software 1618. In object-oriented programming, the terms "Virtual Machine" (VM) and "Runtime Engine" (RE) have recently become associated with software that executes code on a processor or a hardware platform. In the description presented herein, the term "RE" includes VM. A RE often forms part of a larger system or framework that allows a programmer to develop an application for a variety of users in a platform independent manner. For a programmer, the application development process usually involves selecting a framework, coding in an object-oriented programming language associated with that framework, and compiling the code using framework capabilities. The resulting typically platform-independent, compiled code is then made available to users, usually as an executable file and typically in a binary format. Upon receipt of an executable file, a user can execute the application on a RE associated with the selected framework. As discussed herein, an application (e.g., in the form of compiled code, etc.) is optionally provided from and/or to various units and executed on one or more of such units using a RE associated with the selected framework. In general, a RE interprets and/or compiles and executes native machine code/instructions to implement an application or applications embodied in a bytecode and/or an intermediate language code (e.g., an IL code). Further, as discussed herein, one unit (e.g., a controller) optionally serves code to other units, such as, but not limited to, a NLE, a storage, a camera, a telecine, a display, etc.

The exemplary unit 1600 optionally includes features suitable for support of .NET™ framework applications and/or other framework applications. Exemplary systems that have one or more units, which are capable of operating with a framework, are generally extensible and flexible. For example, such a system may be characterized by a ready capability to adapt to new, different, and/or changing requirements and by a ready capability to increase scope and/or application. A framework also typically includes object-oriented programming technologies and/or tools, which can further be partially and/or totally embedded. Such frameworks include, but are not limited to, the .NET™ framework, the ACTIVEX® framework (Microsoft Corporation, Redmond, Wash.), and the JAVA® framework (Sun Microsystems, Inc., San Jose, Calif.).

In general, as already mentioned, a RE is often associated with a particular framework. Further, a framework usually has associated classes which are typically organized in class libraries. Classes can provide functionality such as, but not limited to, input/output, string manipulation, security management, network communications, thread management, text management, and other functions as needed. Data classes optionally support persistent data management and optionally include SQL classes for manipulating persistent data stores through a standard SQL interface. Other classes optionally include XML classes that enable XML data manipulation and XML searching and translations. Often a class library includes classes that facilitate development and/or execution of one or more user interfaces (UIs) and, in particular, one or more graphical user interfaces (GUIs).

As described herein, the RE block 1618 of the exemplary unit 1600 optionally acts as an interface between applications and the OS block 1614. Such an arrangement can allow applications to use the OS advantageously within any particular unit. A unit may also include a browser and a RE that optionally operate in a coordinated manner. Further, a unit optionally has an associated node identifiable using an address or addresses (e.g., IP, HTTP, etc.). In addition, files within a SAN layer or a unit (e.g., locally) are optionally identifiable by universal resource locators (URLs) and data being exchanged between units are optionally formatted using a language such as HTML, XML, etc.

Exemplary Formats for Use in a DPSA

Various aspects of an exemplary DPSA are optionally implemented in an exemplary system that uses the WINDOWS MEDIA™ format, which optionally includes the active stream format and/or the advanced systems format. Various features of the active stream format are described in U.S. Pat. No. 6,041,345, entitled "Active stream format for holding multiple media streams", issued Mar. 21, 2000, and assigned to Microsoft Corporation ('345 patent). The '345 patent is incorporated herein by reference for all purposes, particularly those related to file formats and/or stream formats. The '345 patent defines an active stream format for a logical structure that optionally encapsulates multiple data streams, wherein the data streams may be of different media (e.g., audio, video, etc.). The data of the data streams is generally partitioned into packets that are suitable for transmission over a transport medium (e.g., a network, etc.). The packets may include error correcting information. The packets may also include clock licenses for dictating the advancement of a clock when the data streams are rendered. The active stream format can facilitate flexibility and choice of packet size and bit rate at which data may be rendered. Error concealment strategies may be employed in the packetization of data to distribute portions of samples to multiple packets. Property information may also be replicated and stored in separate packets to enhance error tolerance.

In general, the advanced systems format is a file format used by WINDOWS MEDIA™ technologies and it is generally an extensible format suitable for use in authoring, editing, archiving, distributing, streaming, playing, referencing and/or otherwise manipulating content (e.g., audio, video, etc.). Thus, it is suitable for data delivery over a wide variety of networks and is also suitable for local playback. In addition, it is suitable for use with a transportable storage medium (e.g., a DVD disk, CD disk, etc.). A file container optionally uses an advanced systems format, for example, to store any of the following: audio, video, metadata (e.g., title and author, etc.), and index and script commands (such as URLs and closed captioning); which are optionally stored in a single file. Various features of the advanced systems format appear in a document entitled "Advanced Systems Format (ASF)" from Microsoft Corporation (Doc. Rev. 01.13.00e—current as of 01.23.02). This document is a specification for the advanced systems format and is available through the Microsoft Corporation Web site (www.microsoft.com). The "Advanced Systems Format (ASF)" document (sometimes referred to herein as the "ASF specification") is incorporated herein by reference for all purposes and, in particular, purposes relating to encoding, decoding, file formats and/or stream formats.

An ASF file typically includes three top-level objects: a header object, a data object, and an index object. The header object is commonly placed at the beginning of an ASF file; the data object typically follows the header object; and the index object is optional, but it is useful in providing time-based random access into ASF files. The header object generally provides a byte sequence at the beginning of an ASF file (e.g., a GUID to identify objects and/or entities within an ASF file) and contains information to interpret information within the data object. The header object optionally contains metadata, such as, but not limited to, bibliographic information, etc.

An ASF file and/or stream may include information such as, but not limited to, the following: format data size (e.g., number of bytes stored in a format data field); image width (e.g., width of an encoded image in pixels); image height (e.g., height of an encoded image in pixels); bits per pixel; compression ID (e.g., type of compression); image size (e.g., size of an image in bytes); horizontal pixels per meter (e.g., horizontal resolution of a target device for a bitmap in pixels per meter); vertical pixels per meter (e.g., vertical resolution of a target device for a bitmap in pixels per meter); colors used (e.g., number of color indexes in a color table that are actually used by a bitmap); important colors (e.g., number of color indexes for displaying a bitmap); codec specific data (e.g., an array of codec specific data bytes).

The ASF also allows for inclusion of commonly used media types, which may adhere to other specifications. In addition, a partially downloaded ASF file may still function (e.g., be playable), as long as required header information and some complete set of data are available.

Any given scenario may optionally use one or more multimedia file formats. As already mentioned, the advanced systems format (ASF) is suitable for use in an exemplary system. Another exemplary multimedia file format is known as the advanced authoring format (AAF), which is an industry-driven, cross-platform, multimedia file format that can allow interchange of data between AAF-compliant applications. According to the AAF specification (see, e.g., *Advanced Authoring Format Developers' Guide*, Version 1.0, Preliminary Draft, 1999, which is available at http://aaf.sourceforge.net), "essence" data and metadata can be interchanged between compliant applications using the AAF. As defined by the AAF specification, essence data includes audio, video, still image, graphics, text, animation, music and other forms of multimedia data while metadata includes data that provides information on how to combine or modify individual sections of essence data and/or data that provides supplementary information about essence data. Of course, as used herein, metadata may include, for example, other information pertaining to operation of units and/or components in a computing environment. Further, metadata optionally includes information pertaining to business practices, e.g., rights, distribution, pricing, etc.

The AAF includes an object specification and a software development kit (SDK). The AAF Object Specification defines a structured container for storing essence data and metadata using an object-oriented model. The AAF Object Specification defines the logical contents of the objects and the rules for how the objects relate to each other. The AAF Low-Level Container Specification describes how each object is stored on disk. The AAF Low-Level Container Specification uses Structured Storage, a file storage system, to store the objects on disk. The AAF SDK Reference Implementation is an object-oriented programming toolkit and documentation that allows applications to access data stored in an AAF file. The AAF SDK Reference Implementation is generally a platform-independent toolkit provided in source form, it is also possible to create alternative implementations that access data in an AAF file based on the information in the AAF Object Specification and the AAF Low-Level Container Specification.

The AAF SDK Reference Implementation provides an application with a programming interface using the Component Object Model (COM). COM provides mechanisms for components to optionally interact independently of how the components are implemented. The AAF SDK Reference Implementation is provided generally as a platform-independent source code. AAF also defines a base set of built-in classes that can be used to interchange a broad range of data between applications. However, for applications having additional forms of data that cannot be described by the basic set of built-in classes, AAF provides a mechanism to define new classes that allow applications to interchange data that cannot be described by the built-in classes. Overall, an AAF file and an AAF SDK implementation can allow an application to access an implementation object which, in turn, can access an object stored in an AAF file.

Accordingly, various exemplary methods, devices, and/or systems optionally implement one or more multimedia formats and/or associated software to provide some degree of interoperability. An implementation optionally occurs within an exemplary system at a unit level and/or at a control level. In addition, an exemplary system optionally operates via such an implementation in a computing environment that extends beyond the system.

Exemplary I/Os for Internal and/or External Communication

In various exemplary scenarios, a unit may optionally produce a bit stream capable of carrying variable-bit-rate and/or constant-bit-rate video and/or audio data in a particular format. Again, such bit streams are often measured in terms of bandwidth and in a transmission unit of kilobits per second (kbps), millions of bits per second (Mbps) or billions of bits per second (Gbps). For example, an integrated services digital network line (ISDN) type T-1 can, at the moment, deliver up to 1.544 Mbps and a type E1 can, at the moment, deliver up to 2.048 Mbps. Broadband ISDN (BISDN) can support transmission from 2 Mbps up to much higher, but as yet unspecified, rates. Another example is known as digital subscriber line (DSL) which can, at the moment, deliver up to 8 Mbps. A variety of other examples exist, some of which can transmit at bit rates substantially higher than those mentioned herein. For example, Internet2 can support data rates in the range of approximately 100 Mbps to several gigabytes per second. Transmission technologies suitable for use in various exemplary units and/or interconnection devices optionally include those which are sometimes referred to as gigabit Ethernet and/or fast Ethernet.

Another exemplary digital data I/O option for use in an exemplary unit includes one or more peripheral component interconnects (PCIs). As a standard, a PCI specifies a 64-bit bus, which is optionally implemented as a 32-bit bus that operates at clock speeds of 33 MHz or 66 MHz. At 32 bits and 33 MHz, it yields a throughput rate of approximately 1 Gbps whereas at 64 bits and 66 MHz, yields a significantly higher throughput rate.

Yet another exemplary digital data I/O option for use in an exemplary unit includes one or more serial buses that comply with IEEE 1394 standard, High Performance Serial Bus. According to IEEE 1394, a serial bus can provide a single plug-and-socket connection on which up to 63 devices can be attached with data transfer speeds up to, for example, 400 Mbps. The standard describes a serial bus or pathway between one or more peripheral devices and a computer processor.

An exemplary parallel digital data I/O option for use in an exemplary unit includes one or more small computer system interfaces (e.g., SCSI). One of the latest SCSI standards, Ultra-3 (Ultra160/m) SCSI has a 16-bit bus that can transfer data at up to approximately 160 Mbps. In addition, an exemplary unit may include USB2, fibrechannel, and/or IEEE 1394 communication capabilities.

Various exemplary units and/or exemplary systems optionally provide bit streams at a variety of rates. Such bit streams optionally include video data having a pixel by line format and/or a frame rate that corresponds to a common digital video format as listed in Table 1 below. Table 1 presents several commonly used digital video formats, including 1920×1080, 1280×720, 704×480, and 640×480, given as number of pixels by number of lines; also note that rate ($s^{-1}$) is either fields or frames.

TABLE 1

Common Digital Video Formats

| Lines | Pixels | Aspect Ratio | Rate $s^{-1}$ | Sequence p or i |
|---|---|---|---|---|
| 1080 | 1920 | 16:9 | 24, 30 | Progressive |
| 1080 | 1920 | 16:9 | 30, 60 | Interlaced |
| 720 | 1280 | 16:9 | 24, 30, 60 | Progressive |
| 480 | 704 | 4:3 or 16:9 | 24, 30, 60 | Progressive |
| 480 | 704 | 4:3 or 16:9 | 30 | Interlaced |
| 480 | 640 | 4:3 | 24, 30, 60 | Progressive |
| 480 | 640 | 4:3 | 30 | Interlaced |

Regarding high definition television (HDTV), formats generally include 1,125 line, 1,080 line and 1,035 line interlace and 720 line and 1,080 line progressive formats in a 16:9 aspect ratio. According to some, a format is high definition if it has at least twice the horizontal and vertical resolution of the standard signal being used. There is a debate as to whether 480 line progressive is also "high definition"; it provides better resolution than 480 line interlace, making it at least an enhanced definition format. Various exemplary methods, devices, systems and/or storage media presented herein cover such formats and/or other formats. Regarding bit rates, an exemplary HD video standard specifies a resolution of 1920 pixel by 1080 line, a frame rate of 24 fps, a 10-bit word and RGB color space with 4:2:2 sampling. Such video has on average 30 bits per pixel and an overall bit rate of approximately 1.5 Gbps.

As already mentioned, a SDI/SDTI may receive digital video data according to a SMPTE specification. While some consider the acronyms "SDI" and "SDTI" standards, as used herein, SDI and/or SDTI include standard and/or non-standard serial digital interfaces. As a standard, "SDI" includes a 270 Mbps transfer rate for a 10-bit, scrambled, polarity independent interface, with common scrambling for both component (ITU-R/CCIR 601) video and composite digital video and four channels of (embedded) digital audio, e.g., for system M (525/60) digital television equipment operating with either 10 bit, 4:2:2 component signals or 4 fsc NTSC composite digital signals, wherein "4 fsc" refers generally to composite digital video, e.g., as used in D2 tape format and D3 tape format VTRs, and stands for four times the frequency of subcarrier, which is the sampling rate used. The "SDI" standard includes use of 75-ohm BNC connectors and coax cable as is commonly used for analog video. The "SDTI" standard includes the SMPTE 305M specification and allows for faster than real-time transfers between various servers and between acquisition tapes, disk-based editing systems, and servers; both 270 Mb and 360 Mb, are supported. With typical real-time compressed video transfer rates in the 18 Mbps to 25 Mbps range, "SDTI" has a larger payload capacity and can accommodate, for example, transfers up to four times normal speed. The SMPTE 305M specification describes the assembly and disassembly of a stream of 10-bit words that conform to "SDI" rules. Payload data words can be up to 9 bits and the 10th bit is a complement of the 9th to prevent illegal "SDI" values from occurring.

The SMPTE 259M specification is associated with the "SDI" standard and includes video having a format of 10 bit 4:2:2 component signals and 4 fsc NTSC composite digital signals. The SMPTE 292M specification includes video having a format of 1125 line, 2:1 interlaced, and sampled at 10 bits yields a bit rate of approximately 1.485 Gbps total and approximately 1.244 Gbps active. The SMPTE 292M specification also includes a format having 8 bit, 4:2:2 color sampling that yields approximately 1.188 Gbps total and approximately 0.995 Gbps active. In general, the SMPTE 292M specification describes the "SDTI" based upon SMPTE 259M ("SDI"), SMPTE 260 (1125 line 60 field HDTV), and SMPTE 274 (1920×1080 line, 60 Hz scanning).

Another digital serial interface specification is referred to as the Digital Video Broadcast-Asynchronous Serial Interface or DVB-ASI and is used with MPEG-2 transport. The DVB standards board promotes the ASI design as an industry-standard way to connect components such as encoders, modulators, receivers, and multiplexers. The maximum defined data rate on such a link is 270 Mbps, with a variable useful payload that can depend on equipment.

In view of the forgoing discussion on data communication or transmission, an exemplary unit or system may transmit video data and/or other data through a variety of data I/O interfaces, standards, specifications, protocols, etc. An exemplary system optionally uses units that form an intranet that allows for use of a framework to effectuate control over and/or data flow between various units within the exemplary system. Of course, while not required of any particular exemplary system or unit, video data is also transmittable, either compressed or uncompressed, via such an intranet.

Exemplary Controller Unit for Serving an Executable File and/or Code

Figure 17:
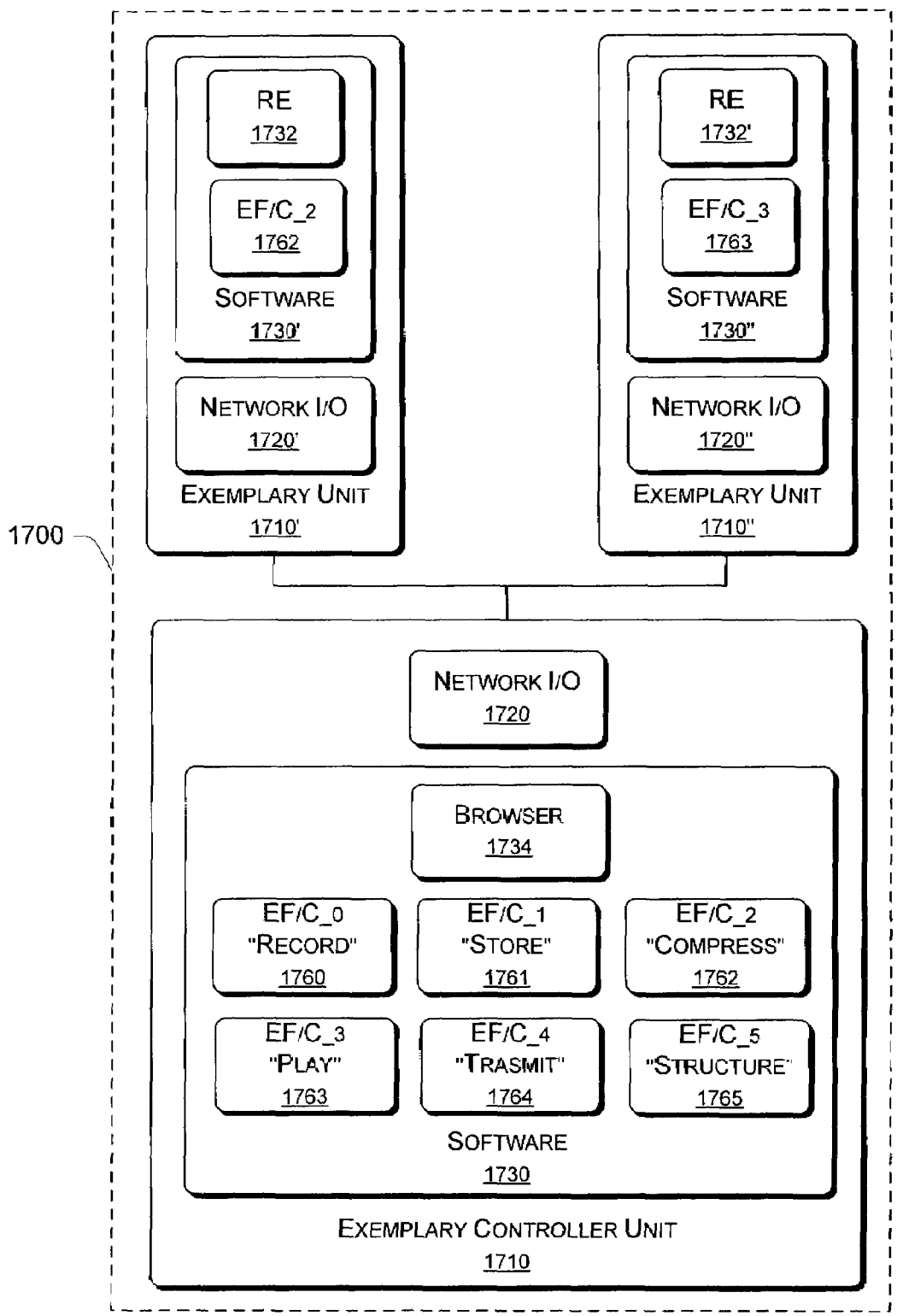
FIG. 17 is a block diagram illustrating an exemplary controller unit and two other exemplary units together with a variety of software blocks.

A block diagram of an exemplary system 1700 having a controller unit 1710 for controlling various exemplary units is shown in FIG. 17. The exemplary controller 1710 includes a network I/O 1720 and a software block 1730, which further includes a browser block 1734 and various executable file and/or code (EF/C) blocks 1760–1765. The browser block 1734 allows the controller to monitor the status of the exemplary units (e.g., on an intranet, etc.) and to serve EF/C blocks and/or other command information. The EF/C__0 block 1760 includes code for effectuating a "record" function (e.g., instructing a service and/or an application to perform a record function, etc.); the EF/C__1 block 1761 includes code for effectuating a "store" function; the EF/C__2 block 1762 includes code for effectuating a "compress" function; the EF/C__3 block 1763 includes code for effectuating a "play" function; the EF/C__4 block 1764 includes code for effectuating a "transmit" function; and the EF/C__5 block 1765 includes code for effectuating a "structure" function. Both of the exemplary units 1710', 1710" include a network I/O block 1720', 1720", software blocks 1730', 1730", and RE blocks 1732, 1732'. In addition, one exemplary unit 1710', includes a EF/C__2 block 1762 for effectuating a "compress" function while the other exemplary unit 1710", includes a EF/C__3 block 1763 for effectuating a "play" function. In addition, the exemplary controller unit 1710 and the exemplary units 1710', 1710" are in communication via communication links, shown as lines between the exemplary units 1710, 1710', 1710".

According to the exemplary controller unit 1710 of FIG. 17, software 1730 includes a variety of executable file and/or code blocks for effectuating a variety of functions (e.g., services and/or applications), such as, for example, those found on a VTR (e.g., instructing a service and/or an application resident on a VCR, etc.). The exemplary controller unit 1710 (e.g., through use of the browser block 1734, associated software and/or the network I/O block 1720), serves, or communicates, an executable file and/or code to various exemplary units 1710', 1710" as required. For example, as shown, the exemplary controller unit 1710 has served a copy of the EF/C__2 1762 block to the exemplary unit 1710', which is optionally an encoder unit. Upon receipt, the exemplary unit 1710' executes the EF/C__2 block 1762 using the RE 1732. In this particular example, execution of the EF/C__2 block 1762 on the exemplary unit 1710' (e.g., an encoder unit) effectuates compression of digital video data. In addition, the EF/C__2 block 1762 optionally includes data specifying compression parameters (e.g., codec, ratio, bit rate, etc.).

Consider also the exemplary unit 1710", which includes a copy of the EF/C__3 block 1763 for effectuating a "play" function. In this example, the controller unit 1710 serves a copy of the EF/C__3 block 1763 to the exemplary unit 1710" (e.g., a decoder unit). The exemplary unit 1710" receives the EF/C__3 block 1763 via the network I/O 1720" and transmits the EF/C__3 block 1763 to memory (e.g., RAM, etc). The software block 1730" also includes the operational RE block 1732", which is typically associated with a framework. The RE block 1732" executes the EF/C__3 block 1763 to thereby effectuate the "play" function. Note that upon execution of the EF/C__3 block 1763, the exemplary unit 1710" may also transmit an executable file and/or code to a storage unit, which, for example, instructs the storage unit to begin transmission of digital video data to the exemplary unit 110" (e.g., a decoder unit). Of course, the various exemplary units may also instruct other units via other means, which may or may not rely on a network, a framework and/or an RE. For example, the exemplary unit 1710" may optionally instruct a storage unit via an RS-422 interface and receive digital video data via a SCSI interface. In either instance, however, according to the exemplary controller unit 1710 of FIG. 17, the "play" function commences typically through execution of an executable file and/or code transmitted via a network.

Regarding the various other exemplary executable file and/or code blocks shown in FIG. 17, the exemplary controller unit 1710 optionally serves: the "record" function EF/C__0 block 1760 to a storage unit and/or an encoder unit; the "store" function EF/C__1 block 1761 to a storage unit and/or an encoder unit; the "transmit" function EF/C__4 block 1764 to a storage unit, an encoder unit, and/or a decoder unit; and the "structure" function block to a storage unit, an encoder unit, and/or a decoder unit. Again, a variety of other functions are also possible, which are optionally effectuated via an executable file and/or code served from a controller unit 1710 and/or other unit.

The exemplary controller unit 1710 optionally operates in conjunction with a digital production services architecture. For example, the exemplary controller 1710 optionally communicates with a storage unit that forms part of a SAN layer. In addition, the executable file/code blocks 1760–1765 are optionally associated with services and/or applications described with a service definition language and/or registered in a registry.

Exemplary Method Using Servable Executable Files and/or Code

Figure 18:
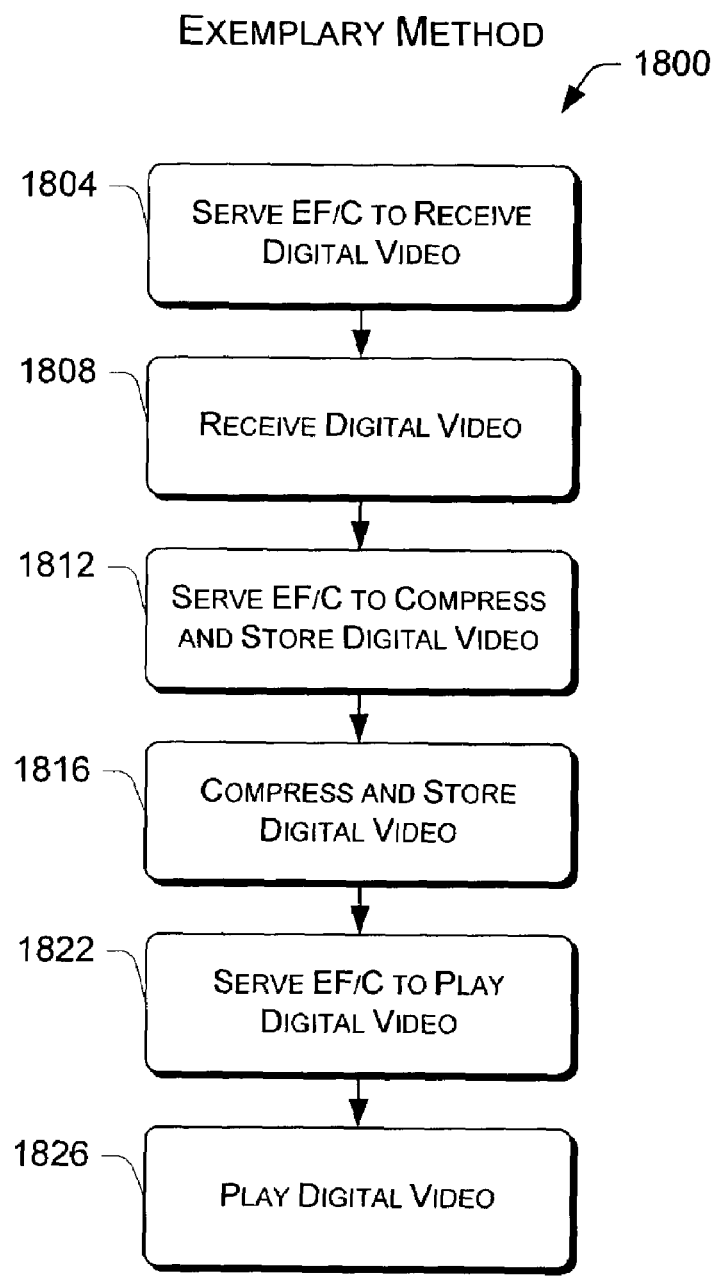
FIG. 18 is a block diagram illustrating an exemplary method for receiving digital video, compressing digital video, storing digital video and/or playing digital video.

A block diagram of an exemplary method 1800 is shown in FIG. 18. According to the exemplary method 1800, in a serve block 1804, a controller unit of an exemplary system serves an executable file and/or code for effectuating reception of digital video data, for example, as provided from a source according to a SMPTE specification. Next, in a reception block 1808, a unit receives the digital video data via a SDI/SDTI I/O and optionally stores the data to a storage medium, for example, local and/or associated with a SAN layer. During and/or after reception, in another serve block 1812, the controller unit of the exemplary system serves an executable file and/or code to effectuate compress and store functions. Next, in a compress and store block 1816, a unit compresses the digital video data to produce compressed digital video data and stores the compressed digital video data. Next, in yet another serve block 1822, the controller unit of the exemplary system serves an executable file and/or code to effectuate a play function. Upon execution of the code, in a play block 1826, a unit plays either compressed and/or uncompressed digital video data. For example, the play function optionally instructs a decoder block to request compressed digital video data from a server unit having associated storage (e.g., SAN layer) and upon receipt of the requested compressed digital video data, the decoder block commences execution of decompression functions to produce uncompressed digital video data suitable for play. In addition, various executable files and/or codes used in this example are optionally associated with a service and/or application described with a service definition language and/or registered in a registry.

Exemplary Unit Having Synchronization Capabilities

Various exemplary units optionally include synchronization capabilities. For example, professional television systems are typically synchronous, e.g., referenced by a common plant synchronization generator. An exemplary unit having synchronization capabilities optionally synchronizes recovered base band video (e.g., video and/or audio) signals to a signal and/or data from a synchronization generator. In general, various exemplary units disclosed herein, and/or functional and/or structural equivalents thereof, optionally have one or more inputs for receiving reference and/or synchronization information. In addition, an exemplary unit optionally generates reference and/or synchronization information, for internal and/or external use. Synchronization may optionally be implemented utilizing NTP (Network Time Protocol,) NTP is a standard TCP/IP based protocol that can synchronize clocks on local computers using radio or atomic clocks signals distributed via the Internet. Utilizing capabilities provided within the Windows Media player SDK, video and/or audio capture or playout can be synchronized to within microseconds across multiple network attached devices, which in some instances may be separated by thousands of miles.

Exemplary Unit Having Video and/or Audio Metadata Capabilities

Various exemplary appliances optionally include video and/or audio metadata ("VAM") capabilities. VAM are optionally processed along with video and/or audio data and/or stored. The VAM are then optionally communicated to a decoder or an audio output and/or display device. Exemplary decoders and/or devices optionally output base band audio and/or video to a system such as a professional television system. Exemplary units having VAM capabilities optionally receive VAM via one input and receive video and/or audio via one or more different inputs. Further, exemplary units having VAM capabilities optionally output VAM via one output and output video and/or audio via one or more different outputs.

An exemplary unit having VAM capabilities may also have a communication link (e.g., direct or indirect) to a server (e.g., server unit). For example, a server may transmit VAM to a unit and/or receive VAM from a unit. Such a server may also have communication links to other units.

A camera or a telecine optionally include an encoder unit (e.g., the encoder unit 1520 of FIG. 15, etc.) and have an output and/or an input for VAM. A camera or a telecine may also optionally include a server unit and/or a controller unit (e.g., the server unit 1540 and the controller unit 1580 of FIG. 15, etc.) and have an output and/or an input for VAM. A media player (e.g., for TV on air playback, kiosk operations, editorial monitoring, etc.) optionally includes a server unit and/or a decoder unit (e.g., the server unit 1540 and the decoder unit 1560 of FIG. 15, etc.) and has an output and/or an input for VAM. Such cameras, telecines and media players optionally communicate with a server, which optionally supplies VAM.

Exemplary Framework Capabilities and Interoperability

As already mentioned, various exemplary methods, devices and/or systems optionally include framework capabilities that allow for control and/or interoperability. Such capabilities optionally exist as part of an EAI/BPA layer and/or an S/A layer and/or other layer(s). Framework capabilities optionally include global and/or local use of a standard or standards for interoperability. Such standards for data interoperability include, but are not limited to, Extensible Markup Language (XML), Document Object Model (DOM), XML Path Language (XPath), Extensible Stylesheet Language (XSL), Extensible Style Language Transformations (XSLT), Schemas, Extensible Hypertext Markup Language (XHTML), etc. In addition, framework capabilities optionally include use of Component Object Model (COM), Distributed Component Object Model (DCOM), Common Object Request Broker Architecture (CORBA), MICROSOFT® Transaction Server (MTS), JAVA® 2 Platform Enterprise Edition (J2EE), Simple Object Access Protocol (SOAP), etc. to implement interoperability. For example, use of SOAP can allow an application running in one operating system to communicate with an application running in the same and/or another operating system by using standards such as the World Wide Web's Hypertext Transfer Protocol (HTTP) and Extensible Markup Language (XML) for information exchange. Such information optionally includes, but is not limited to, video, audio and/or metadata (VAM) information.

Various exemplary methods, devices and/or systems optionally use XML in conjunction with XML message-passing guidelines to provide interoperability. For example, an initiative using BIZTALK® software includes XML message-passing guidelines that facilitate sharing of data in a computing environment. In general, BIZTALK® software can allow for development and management of processes in a computing environment. By supporting traditional Web technologies such as XML and SOAP, BIZTALK® software can leverage open standards and/or specifications in order to integrate disparate applications independent of operating system, programming model or programming language. Of course, other software may also leverage such standards and/or specifications to achieve a desired level of integration and/or interoperability.

Framework capabilities may also include use of a variety of interfaces, which are implemented to expose hardware and/or software functionality of various units and/or components. For example, a non-linear editing (NLE) device may implement an application programming interface (API) that exposes hardware and/or software functionality. In this example, the API is optionally associated with a framework (e.g., a framework capability), such as, but not limited to, the .NET™ framework, and allows a controller (or other unit) to access functionality of the NLE device. In such an exemplary system, framework capabilities may expose types, classes, interfaces, structures, modules (e.g., a collection of types that can be simple or complex), delegates, enumerations, etc. and framework capabilities may also use rich metadata describing types and dependencies. Of course, other manners of exposing hardware and/or software functionality may be suitable, such as, those that involve use of a COM dynamic-link library (DLL) wherein COM classes optionally expose COM interfaces.

Exemplary System and/or Method Having Framework Capabilities

Figure 19:
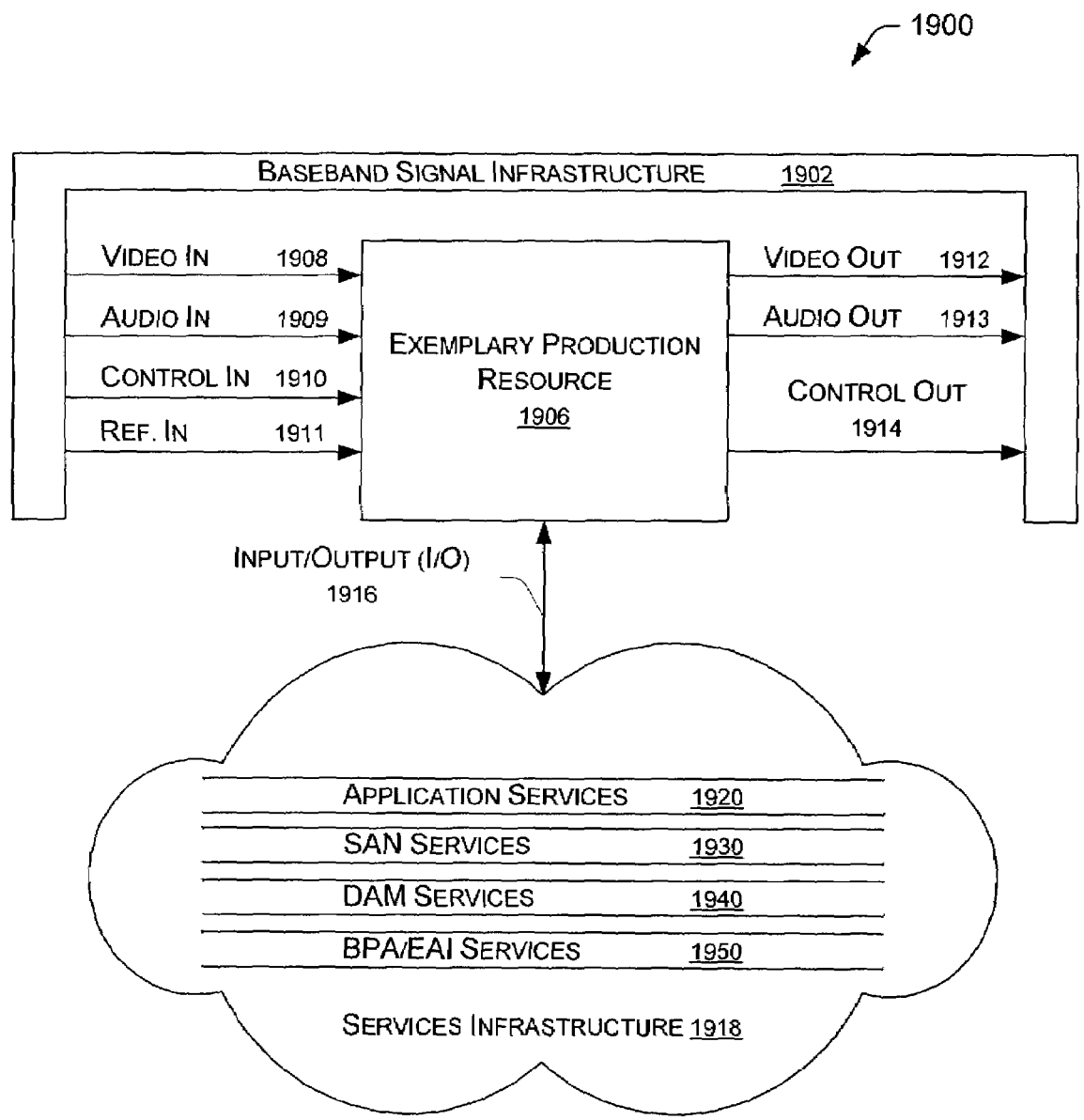
FIG. 19 is a block diagram illustrating an exemplary system having framework capabilities.

Referring to FIG. 19, an exemplary system 1900 having framework capabilities is shown. The exemplary system 1900 includes a baseband signal infrastructure 1902 and a services infrastructure 1918. The baseband signal infrastructure 1902 includes an exemplary production resource 1906 for receiving various input signals 1908–1911 and outputting various output signals 1912–1914. Input signals include video in 1908, audio in 1909, control in 1910 and reference in 1911. A control signal may allow for control and timing of baseband video and/or audio. Output signals include video out 1912, audio out 1913 and control out 1914. Of course, a particular production resource may use fewer or more signals or signals other than those shown in FIG. 19.

The exemplary system 1900 also includes one or more I/Os (e.g., I/O 1916) for communication between the baseband signal infrastructure 1902 and the services infrastructure 1918. In such a manner, a wide variety of services are made available to the baseband signal infrastructure 1902. For example, the exemplary services infrastructure 1918 includes application services 1920, SAN services 1930, DAM services 1940 BPA/EAI services 1950. Corresponding layers (e.g., an S/A layer, a SAN layer, a DAM layer, and a BPA/EAI layer) may provide such services and be organized in a digital production services architecture. In addition, the exemplary production resource 1906 may form part of a layer.

In one example, the I/O 1916 is a network I/O and the services infrastructure 1918 is available as a network resource. Further, the services infrastructure 1918 optionally relies on one or more frameworks. Yet further, the exemplary production resource 1906 may include framework capabilities that allow for control and/or interoperability. Thus, the exemplary system 1900 may include services made available via .NET™ framework capabilities. Such .NET™ framework capabilities may include software for connecting and/or enabling devices and/or services via a network. Services may include software network services, such as, but not limited to, an XML software service exposed on a network through a communication protocol (e.g., SOAP), described with a network service definition language (e.g., Web service definition language) file and registered in a registry according to a discovery and integration standard (e.g., Universal Description Discovery and Integration Standard). In general, framework capabilities can enhance software integration in a networked system.

Exemplary Uses in Professional and/or Other Sectors

Various exemplary methods, systems, units and/or architectures described herein are suitable for use in professional and/or other sectors that rely on video and/or audio information. In particular, such exemplary methods, systems, units and/or architectures may enhance of acquisition, processing and/or distribution. Table 2 shows sector type along with acquisition, processing and distribution features that may pertain to a given sector type.

TABLE 2

Types of Sectors and Exemplary Characteristics

| Type | Acquisition | Processing | Distribution |
|---|---|---|---|
| Broadcast | Approx. 95% contribution<br>Approx. 5% mastering<br>Real-time, reliability, durability | Editorial<br>Temporal<br>Compositing | SDTV<br>HDTV<br>Network |
| HD/Film | Approx. 95% mastering<br>Approx. 5% contribution<br>Quality | Compositing<br>Color<br>Editorial<br>Telecine | Theatrical<br>VHS<br>DVD<br>Airline<br>Hotel |
| Corporate Industry | Approx. 50% contribution<br>Approx. 50% consumption<br>Real-time, inexpensive | Editorial | TVPN<br>VHS |
| Government Science | Approx. 50% contribution<br>Approx. 50% mastering<br>Standards-based, secure platforms | False color<br>Histographic<br>Overlays<br>Temporal<br>Database | Secure Net<br>Video |
| Security | Approx. 100% consumption<br>Reliable, inexpensive | Quad split<br>Multi-cam<br>Switch | Monitor<br>VHS |

In Table 2, "mastering" refers generally to a video quality such as full bandwidth RGB or film negative. Mastering quality is suitable for seamless compositing (e.g., multilayered effects), such as blue screens, etc. "Contribution" refers generally to a video quality that is slightly compressed, for example, to YUYV and/or component analog. "Consumption" refers generally to a video quality associated with typical over-the-air or cable television and also includes DVD, VHS and/or composite analog.

While the description herein generally refers to "video" many formats discussed herein also support audio. Thus, where appropriate, it is understood that audio may accompany video. Although some exemplary methods, devices and exemplary systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A digital production services architecture comprising:
   a services and/or applications layer;
   a storage area network layer;
   a digital asset management layer;
   an enterprise applications integration and/or business process automation layer; and
   a network connecting the layers and allowing for transmission of digital video and/or metadata.

2. The architecture of claim 1, wherein the services and/or applications layer includes services and/or applications for acquisition, processing and/or transmission of digital video.

3. The architecture of claim 2, wherein the services and/or applications are exposed on the network according to a communication protocol.

4. The architecture of claim 2, wherein the services and/or applications are described with a network service definition language.

5. The architecture of claim 1, wherein the storage area network layer allows for synchronization of files containing digital video.

6. The architecture of claim 1, wherein the digital asset management layer includes metadata related to digital video.

7. The architecture of claim 1, wherein the enterprise applications integration and/or business process automation layer allows for event and/or message processing.

8. The architecture of claim 1, further comprising framework capabilities.

9. The architecture of claim 8, wherein the framework capabilities include a runtime engine.

10. A unit comprising:
one or more communication links for digital video and/or metadata;
a service and/or an application for acquisition, processing and/or transmission of digital video; and
a software interface and/or a software connector that exposes the service and/or the application on a network.

11. The unit of claim 10, wherein the software interface and/or the software connector expose the service and/or the application according to a communication protocol.

12. The unit of claim 10, wherein the service and/or the application is described with a network service definition language.

13. The unit of claim 10, further comprising framework capabilities.

14. The unit of claim 13, wherein the framework capabilities include a runtime engine.

15. A method comprising:
acquiring digital video using an acquisition service and/or an acquisition application exposed to a network through use of a software interface and/or a software connector; and
processing the digital video using a processing service and/or a processing application exposed to the network through use of a software interface and/or a software connector.

16. The method of claim 15, wherein the acquiring includes acquiring metadata.

17. The method of claim 15, wherein the processing includes processing metadata.

18. The method of claim 15, further comprising indexing the digital video using an indexing service and/or an indexing application exposed to the network through use of a software interface and/or a software connector.

19. The method of claim 15, further comprising storing the digital video to a storage area network (SAN).

20. The method of claim 15, further comprising transmitting the digital video using a transmission service and/or a transmission application exposed to the network through use of a software interface and/or a software connector.

21. The method of claim 15, wherein the acquiring includes recording video and/or playing recorded video.

22. The method of claim 15, wherein the processing includes editing the digital video.

23. The method of claim 15, wherein the processing include transcoding and/or encoding the digital video.

24. The method of claim 15, further comprising messaging.

25. A video system comprising a data architecture having one or more layers selected from the group consisting of service and/or application layers, storage area network layers, digital asset management layers and control and/or messaging layers and wherein the one or more layers include framework capabilities and communication links to a network.

26. The video system of claim 25, wherein the framework capabilities include a runtime engine.

27. The video system of claim 25, wherein the one or more layers include software interfaces and/or software connectors.

28. The video system of claim 27, wherein the software interfaces include a .NET™ software interface.

29. The video system of claim 27, wherein the software connectors include a BIZTALK® software connector.

30. The video system of claim 25, wherein the network comprises an intranet.

31. The video system of claim 25, wherein the video system includes a services and/or applications layer having a service and/or an application for transmitting digital video to a plurality of end user devices.

32. The video system of claim 25, wherein the services and/or applications layer includes services and/or applications described using a service definition language.

33. A video system comprising:
a baseband infrastructure;
a communication link; and
a services infrastructure wherein the communication link allows for communication of digital video and/or metadata between the baseband infrastructure and the services infrastructure.

34. The video system of claim 33, wherein the services infrastructure includes digital video applications services, digital video storage services, digital video asset management services and business and/or enterprise services.

35. The video system of claim 33, wherein the baseband infrastructure comprises a digital video production resource configured to receive digital video and to output digital video.

* * * * *